United States Patent
Miller et al.

(10) Patent No.: US 12,017,801 B2
(45) Date of Patent: Jun. 25, 2024

(54) PITCH-YAW ACTUATION SYSTEM AND METHOD FOR ACTUATING A DEVICE HEAD

(71) Applicant: The Boeing Company, Chicago, IL (US)

(72) Inventors: John Eric Miller, Oberlin, OH (US); Shane Edward Arthur, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 238 days.

(21) Appl. No.: 17/660,405

(22) Filed: Apr. 23, 2022

(65) Prior Publication Data
US 2022/0388685 A1    Dec. 8, 2022

Related U.S. Application Data

(60) Provisional application No. 63/202,244, filed on Jun. 2, 2021.

(51) Int. Cl.
*B64F 5/10*     (2017.01)
*B05B 13/02*    (2006.01)
(Continued)

(52) U.S. Cl.
CPC ............ *B64F 5/10* (2017.01); *B05B 13/0214* (2013.01); *B05B 13/0415* (2013.01); *B05D 1/02* (2013.01)

(58) Field of Classification Search
CPC ... B64F 5/10; B05B 13/0214; B05B 13/0415; B05D 1/02; B41J 3/407; B41J 2/01
See application file for complete search history.

(56) References Cited

U.S. PATENT DOCUMENTS 4,534,694 A * 8/1985 Tuda .................. B25J 9/14
                                              901/6
5,931,098 A * 8/1999 Bates ................. B41J 25/308
                                              101/43
(Continued)

FOREIGN PATENT DOCUMENTS

CN     103660658         3/2014
CN     107914467 A  *    4/2018    ............. B05B 1/14
(Continued)

OTHER PUBLICATIONS

EPO, Extended European Search Report for Application No. 22176248, issued on Oct. 28, 2022.
(Continued)

*Primary Examiner* — Zakaria Elahmadi

(57) ABSTRACT

A pitch-yaw actuation system includes a pitch frame, a yaw frame, a pitch actuator, a yaw actuator, and a universal joint assembly. The pitch frame is pivotably coupled to a device frame via a pitch hinge. The yaw frame is pivotably coupled to the pitch frame via a yaw hinge. The pitch actuator pivots the pitch frame about a pitch axis. The yaw actuator pivots the yaw frame about a yaw axis oriented orthogonal to the pitch axis. The universal joint assembly couples the yaw actuator to the yaw frame, and includes a universal joint slidably coupled to a linear guide mechanism. The guide mechanism axis is oriented at an angle that allows the universal joint to move in a manner accommodating misalignment of the yaw actuator with the yaw frame during pivoting of at least one of the pitch frame and the yaw frame.

20 Claims, 22 Drawing Sheets

(51) Int. Cl.
B05B 13/04 (2006.01)
B05D 1/02 (2006.01)

(56) References Cited

U.S. PATENT DOCUMENTS

| | | | |
|---|---|---|---|
| 7,350,890 B2 | 4/2008 | Baird et al. | |
| 8,088,450 B2 * | 1/2012 | Swanberg | B05B 13/005 |
| | | | 427/427.2 |
| 10,144,183 B2 | 12/2018 | Baker | |
| 10,220,408 B2 | 3/2019 | Eng | |
| 10,293,601 B2 | 5/2019 | Baker | |
| 10,307,788 B2 | 6/2019 | Arthur et al. | |
| 10,308,039 B2 | 6/2019 | Mathis | |
| 10,369,679 B2 | 8/2019 | Moriarty | |
| 10,377,092 B2 | 8/2019 | Baker | |
| 10,384,217 B2 | 8/2019 | Halamandaris | |
| 10,384,482 B2 | 8/2019 | Eng | |
| 10,501,208 B2 | 12/2019 | Whitlaw | |
| 10,532,561 B2 | 1/2020 | Ingram | |
| 10,745,251 B2 | 8/2020 | Miller | |
| 10,875,045 B2 * | 12/2020 | Vasa | G01B 11/0608 |
| 10,953,417 B2 | 3/2021 | Halamandaris | |
| 2009/0111701 A1 | 4/2009 | Ahn | |
| 2014/0347413 A1 | 11/2014 | Ehara | |
| 2018/0071773 A1 * | 3/2018 | Eng | B05B 12/124 |
| 2018/0099518 A1 * | 4/2018 | Eng | B41M 5/0011 |
| 2018/0126514 A1 * | 5/2018 | Moriarty | B24B 19/26 |
| 2018/0169687 A1 | 6/2018 | Vasa | |
| 2019/0002130 A1 * | 1/2019 | Whitlaw | B25J 9/0036 |
| 2019/0247884 A1 | 8/2019 | Arthur | |
| 2020/0198338 A1 * | 6/2020 | Riley | B41J 3/407 |
| 2021/0094221 A1 | 4/2021 | Smith | |
| 2021/0331193 A1 | 10/2021 | Yaghoobi | |
| 2021/0387834 A1 * | 12/2021 | Olberg | B25J 9/026 |

FOREIGN PATENT DOCUMENTS

| | | | | |
|---|---|---|---|---|
| CN | 109079842 A | * | 12/2018 | B25J 15/0019 |
| CN | 109417043 A | * | 3/2019 | B05C 5/0208 |
| EP | 0455371 | | 11/1991 | |
| EP | 2208541 | | 7/2010 | |
| EP | 2740563 | | 6/2014 | |
| EP | 2740563 A1 | * | 6/2014 | B23K 26/0884 |
| EP | 2839964 | | 2/2015 | |
| EP | 3292914 | | 3/2018 | |
| EP | 3321088 | | 5/2018 | |
| EP | 3321088 A1 | * | 5/2018 | B05B 1/14 |
| EP | 3351308 | | 7/2018 | |
| EP | 3351308 A1 | * | 7/2018 | B05B 1/14 |
| JP | 2018035881 | | 3/2018 | |

OTHER PUBLICATIONS

Wittstein Data Sheet, Cyber dynamic line—linear actuator, available at <https://cyber-motor.wittenstein-us.com/products/servo-motors/linear-actuators/cyber-dynamic-actuator-I-with-ball-screw/>, retrieved on May 2, 2021.

Xaar Data Sheet, Xaar 1003 inkjet printhead, available at <https://www.xaar.com/en/products/xaar-printheads/xaar-1003-c/>, retrieved on Apr. 6, 2021.

EPO, Extended European Search Report for Application No. 22169755, issued on Nov. 2, 2022.

* cited by examiner

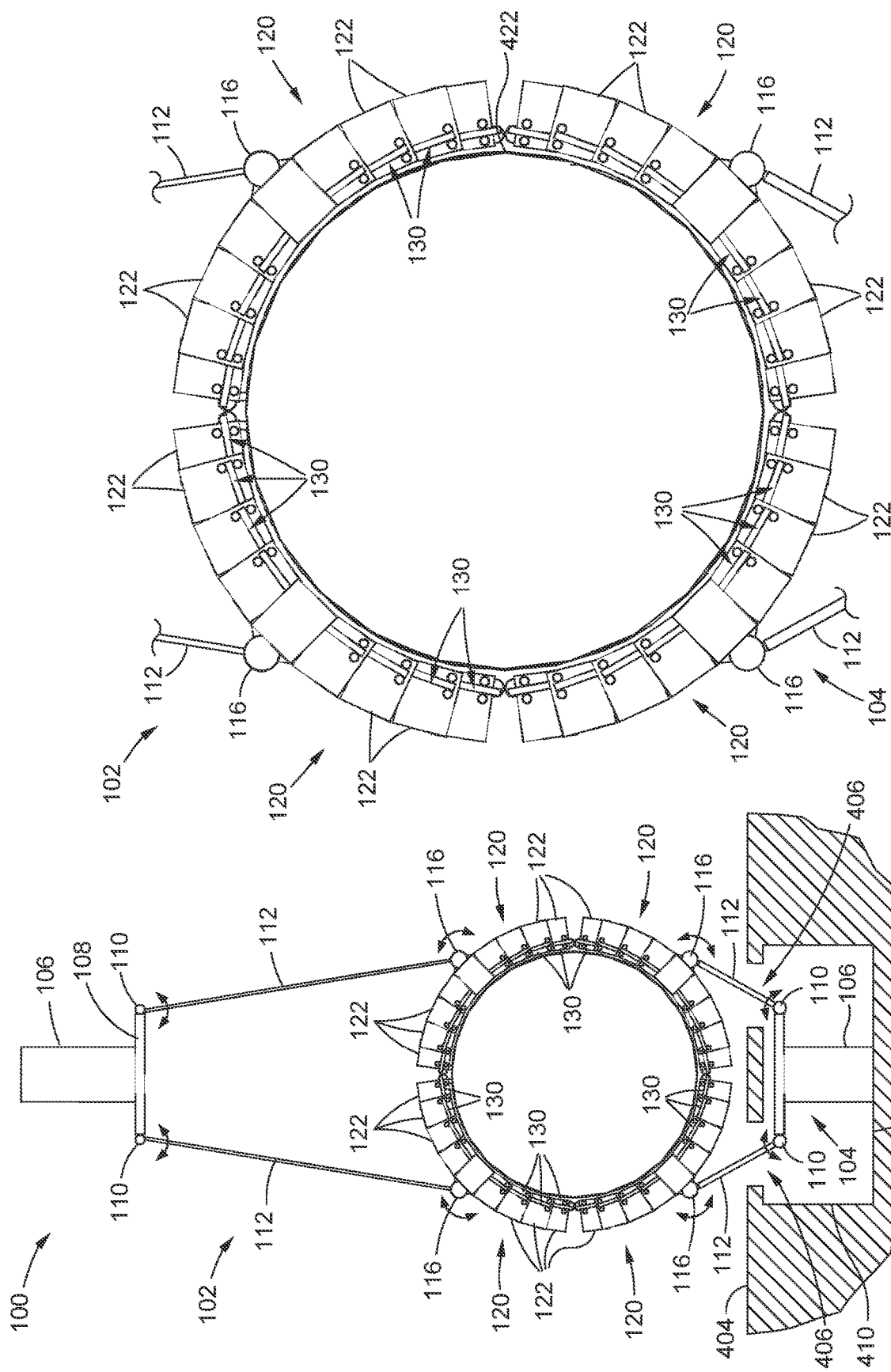

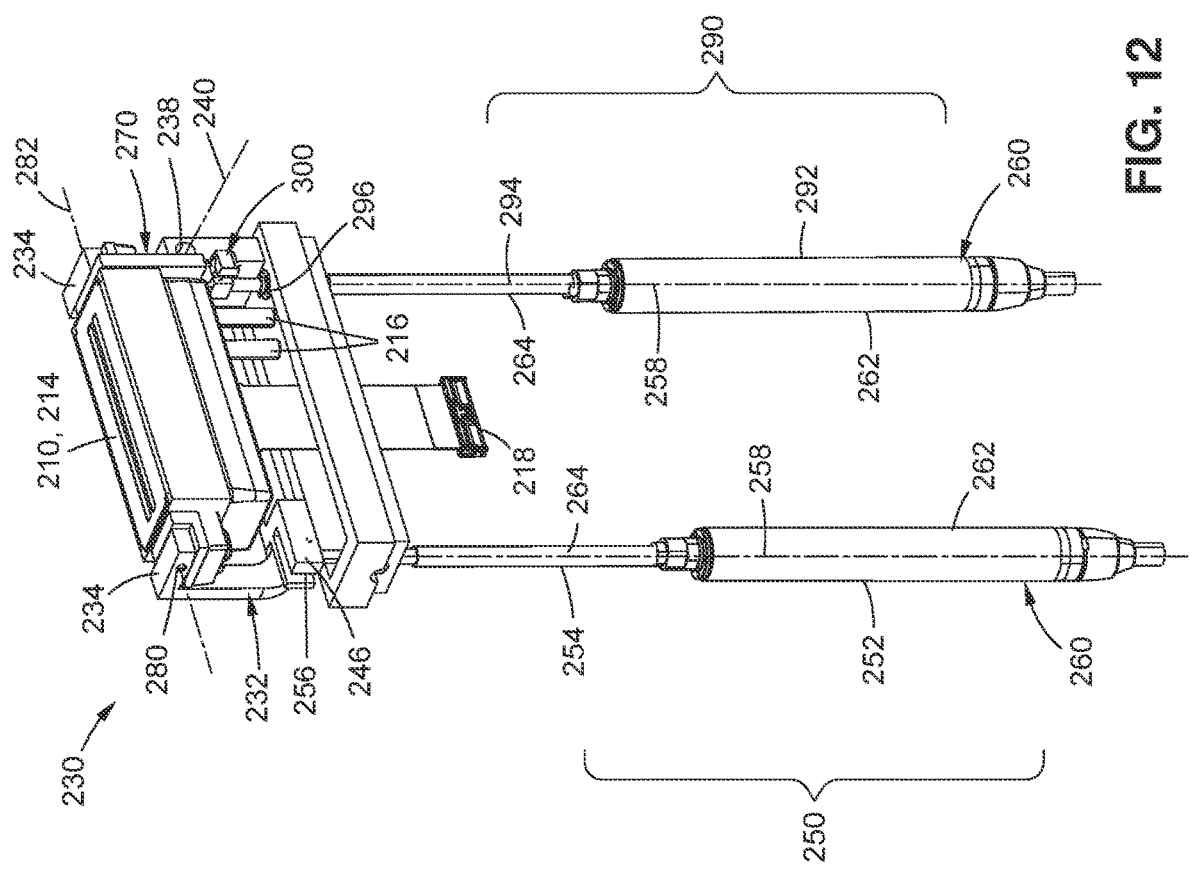

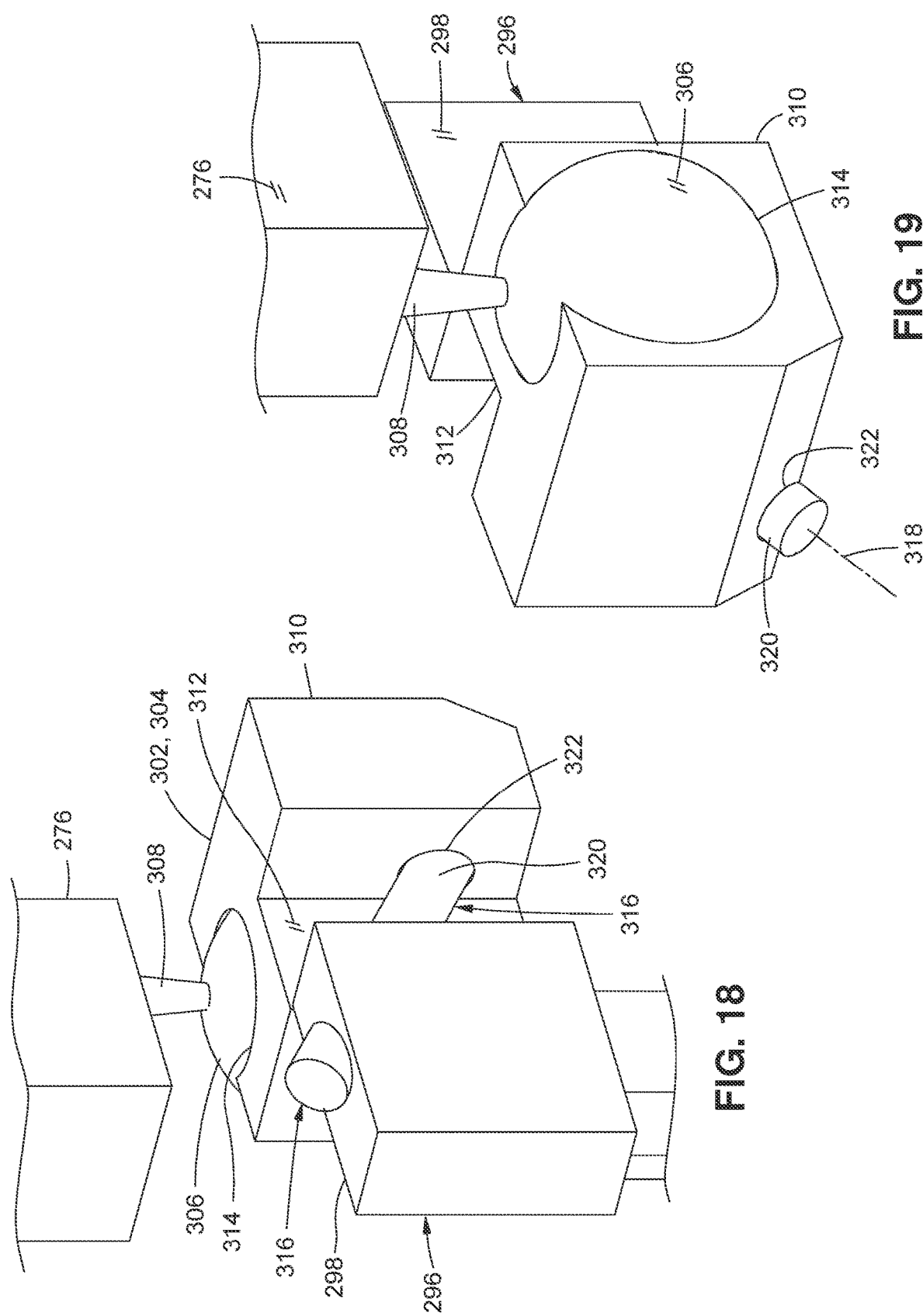

PITCH-YAW ACTUATION SYSTEM AND METHOD FOR ACTUATING A DEVICE HEAD

CROSS-REFERENCE TO RELATED APPLICATION

This non-provisional application claims priority to U.S. Provisional Application Ser. No. 63/202,244, entitled PITCH-YAW ACTUATION SYSTEM AND METHOD FOR ACTUATING A DEVICE HEAD, filed Jun. 2, 2021, and which is incorporated herein by reference in its entirety.

FIELD

The present disclosure relates generally to actuation systems and, more particularly, to a system for actuating a device along multiple axes.

BACKGROUND

The painting of an aircraft is a challenging process due to the large amount of surface area and unique geometry of aircraft surfaces. For example, the nose and tail of an aircraft are typically highly contoured, which presents challenges in applying coatings in a precise manner. Adding to the challenge are complex paint schemes associated with an aircraft livery. For example, the livery of an airline may include images or designs that have complex geometric shapes and color combinations. In addition, an aircraft livery may include the name and logo of the airline, which may be applied to different locations on the aircraft such as the fuselage and the vertical tail. The process of applying the livery to the aircraft surfaces must be carried out with a high level of precision to meet aesthetic requirements, and to ensure that the coating thickness is within desired tolerances to meet aircraft performance (e.g., weight) requirements.

One method of painting an aircraft involves the use of individual robotic devices. Each robotic device includes an end effector mounted on a robotic arm. The robotic arm of each robotic device moves the end effector over the aircraft surfaces while the end effector dispenses any one of a variety of different paint colors, such as for applying an aircraft livery. Although the use of robotic devices reduces the amount of time required for aircraft painting relative to conventional manual methods that involve masking, painting, and demasking, the use of a single end effector on each robotic device results in a relative lengthy painting process.

To reduce the amount of time required for aircraft painting, an array of treatment devices can be assembled wherein each treatment device is configured to dispense paint onto the aircraft surfaces as the array is moved over the length of the aircraft. To provide a high level of flexibility in applying an aircraft livery, each treatment device includes a plurality of device heads. The devices heads must be assembled in close proximity to each other to allow for a high level of precision in applying the livery. In addition, each device head must be capable of being actuated along multiple axes to ensure that each device head is oriented complementary to the changing contours of the aircraft surfaces as the array of treatment devices is moved along the length of the aircraft. Existing mechanisms for actuating devices along multiple axes involve the use of rotary actuators. Unfortunately, rotary actuators are bulky, and are therefore difficult to package within a small area.

As can be seen, there exists a need in the art for a system for actuating a device along multiple axes, and which is capable of being packaged within a small area.

SUMMARY

The above-noted needs associated with actuating a device along multiple axes are addressed by the presently-disclosed pitch-yaw actuation system for actuating a device head. The pitch-yaw actuation system includes a pitch frame, a yaw frame, a pitch actuator, a yaw actuator, and a universal joint assembly. The pitch frame is configured to be pivotably coupled to a device frame via a pitch hinge having a pitch axis. The yaw frame is configured to be pivotably coupled to the pitch frame via a yaw hinge having a yaw axis orthogonal to the pitch axis. The pitch actuator is configured to pivot the pitch frame about the pitch axis. The yaw actuator is configured to pivot the yaw frame about the yaw axis. The universal joint assembly is configured to couple the yaw actuator to the yaw frame. The universal joint assembly includes a linear guide mechanism having a guide mechanism axis. In addition, the universal joint assembly includes a universal joint that is slidably couplable to the linear guide mechanism. The guide mechanism axis is oriented at an angle that allows the universal joint to move in a manner accommodating misalignment of the yaw actuator with the yaw frame during pivoting of at least one of the pitch frame and the yaw frame.

Also disclosed is a device head assembly, which includes a head frame and a pitch-yaw actuation system. The pitch-yaw actuation system includes a pitch frame, a yaw frame, a pitch actuator, a yaw actuator, and a universal joint assembly. The pitch frame is coupled to the head frame via a pitch hinge having a pitch axis. The yaw frame is coupled to the pitch frame via a yaw hinge having a yaw axis orthogonal to the pitch axis. The yaw frame is configured to receive a device head. The pitch actuator is coupled to the head frame and is configured to pivot the pitch frame about the pitch axis. The yaw actuator is coupled to the head frame and is configured to pivot the yaw frame about the yaw axis. The universal joint assembly is configured to couple the yaw actuator to the yaw frame. The universal joint assembly includes a linear guide mechanism having a guide mechanism axis. In addition, the universal joint assembly includes a universal joint that is slidably couplable to the linear guide mechanism. The guide mechanism axis is oriented at an angle allowing the universal joint to move relative to the linear guide mechanism in a manner accommodating misalignment of the yaw actuator with the yaw frame during pivoting of the pitch frame and the yaw frame.

In addition, disclosed is a method of actuating a device head, which includes pivoting, using a pitch actuator, a pitch frame about a pitch axis of a pitch hinge coupling the pitch frame to a head frame. In addition, the method includes pivoting, using a yaw actuator, a yaw frame about a yaw axis of a yaw hinge coupling the yaw frame to the pitch frame. The yaw axis is oriented orthogonal to the pitch axis. The yaw actuator is coupled to the yaw frame via a linear guide mechanism and a universal joint slidably coupled to the linear guide mechanism. The method also includes moving the universal joint relative to the linear guide mechanism in a manner accommodating misalignment of the yaw actuator with the yaw frame during pivoting of at least one of the pitch frame and the yaw frame.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a sectional view taken along line 3-3 of FIG. 2, and illustrating an upper treatment device support assembly and a lower treatment device support assembly, each supporting a plurality of treatment devices surrounding the fuselage;

FIG. 4 is a magnified view of the upper and lower treatment device support assemblies of FIG. 3;

FIG. 12 is a perspective view of the device head assembly with the lower portion of the head frame omitted, and illustrating a pitch actuator and a yaw actuator of the pitch-yaw actuation system;

FIG. 18 is a magnified view of the universal joint assembly taken along line 18 of FIG. 17;

FIG. 19 is a magnified view of the universal joint assembly taken along line 19 of FIG. 17;

DETAILED DESCRIPTION

Figure 1:
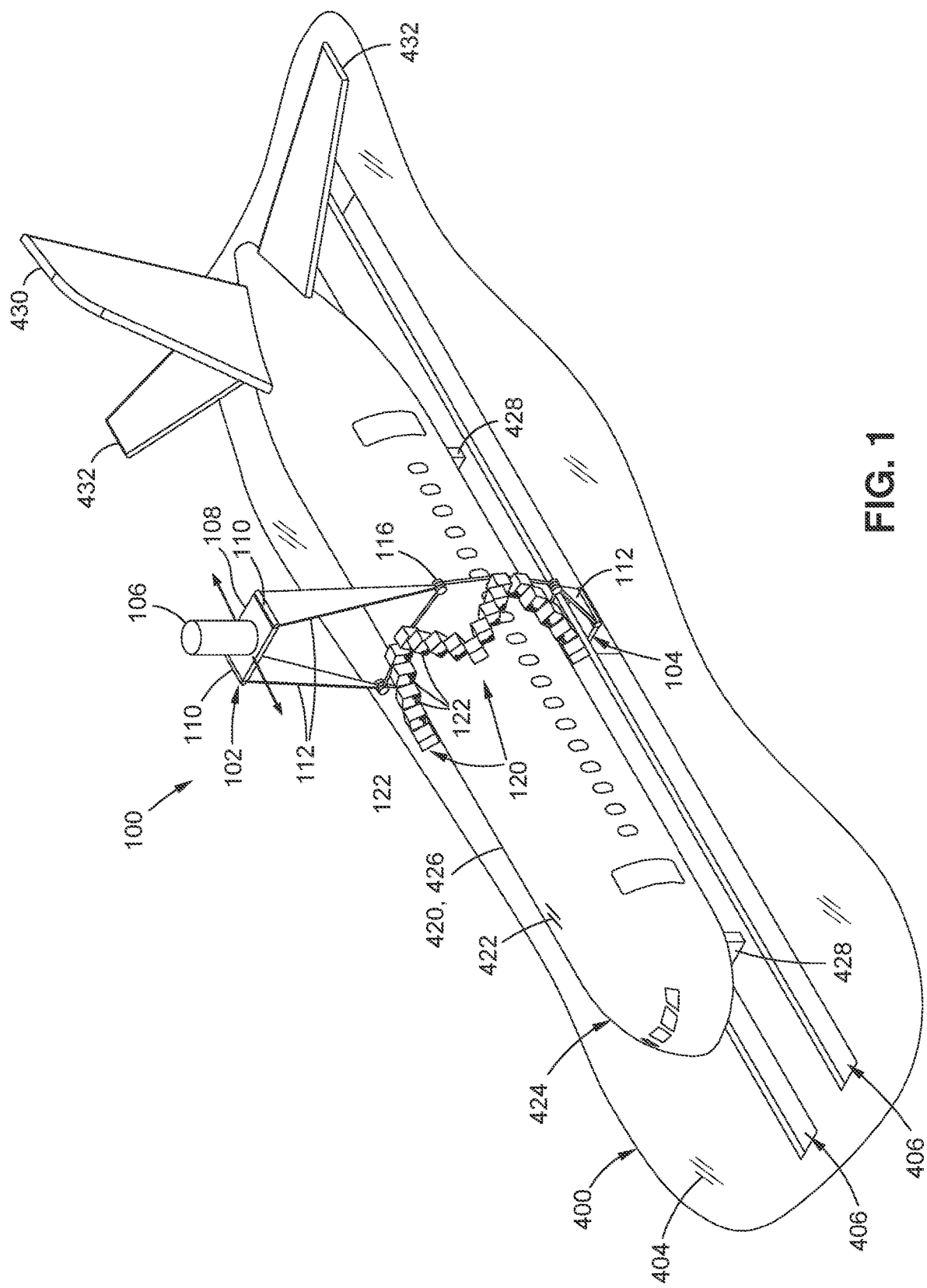
FIG. 1 is a perspective view of an example of a treatment device system 100 comprising a plurality of treatment devices supported by a treatment device support assembly for applying a treatment to the surfaces of a fuselage as the treatment device system 100 is moved along the lengthwise direction of the fuselage.

Referring now to the drawings which illustrate preferred and various examples of the disclosure, shown in FIGS. 1-4 is an example of a treatment device system 100 for treating the article surfaces 422 of an article 420. The treatment device system 100 includes an upper treatment device support assembly 102, and a lower treatment device support assembly 104, each configured to support an array 120 of treatment devices 122. In the example shown, the article 420 is a fuselage 426 of an aircraft 424 having a vertical tail 430 and a pair of horizontal tails 432. The fuselage 426 is shown supported on the floor 404 of a treatment facility 400 using fuselage support stands 428.

The treatment devices 122 of each treatment device support assembly 102, 104 are interconnected by a plurality of device actuation systems 130 (FIG. 4) for actuating the treatment devices 122. The device actuation systems 130 are configured to translate and/or rotate the treatment devices 122 in a manner to position each treatment device 122 complementary to an article surface 422 over which the treatment device system 100 is being moved.

Figure 7:
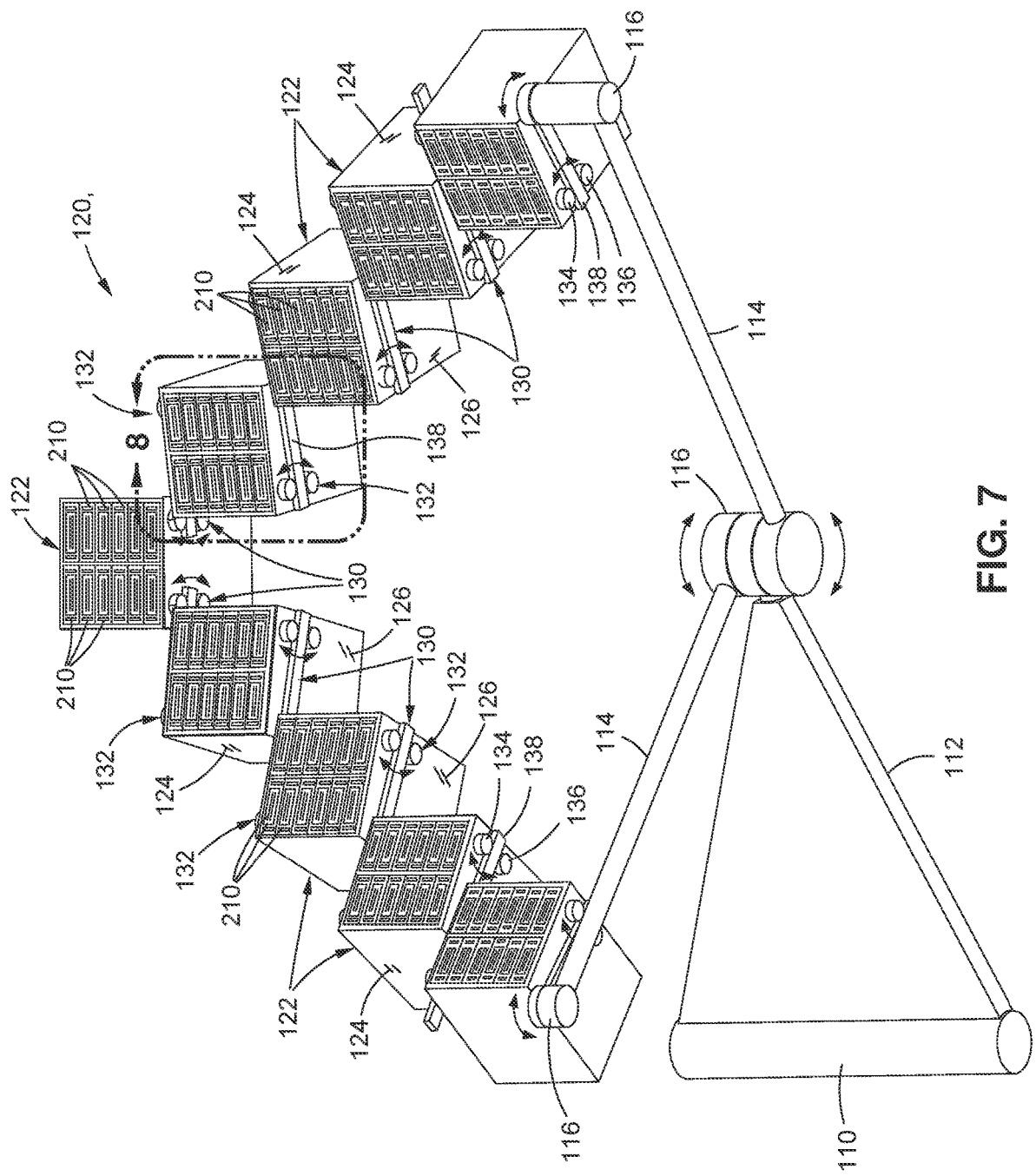
FIG. 7 is a perspective view of an example of an array of treatment devices interconnected by a plurality of device actuation systems, and illustrating each treatment device having a plurality of device heads.
Figure 9:
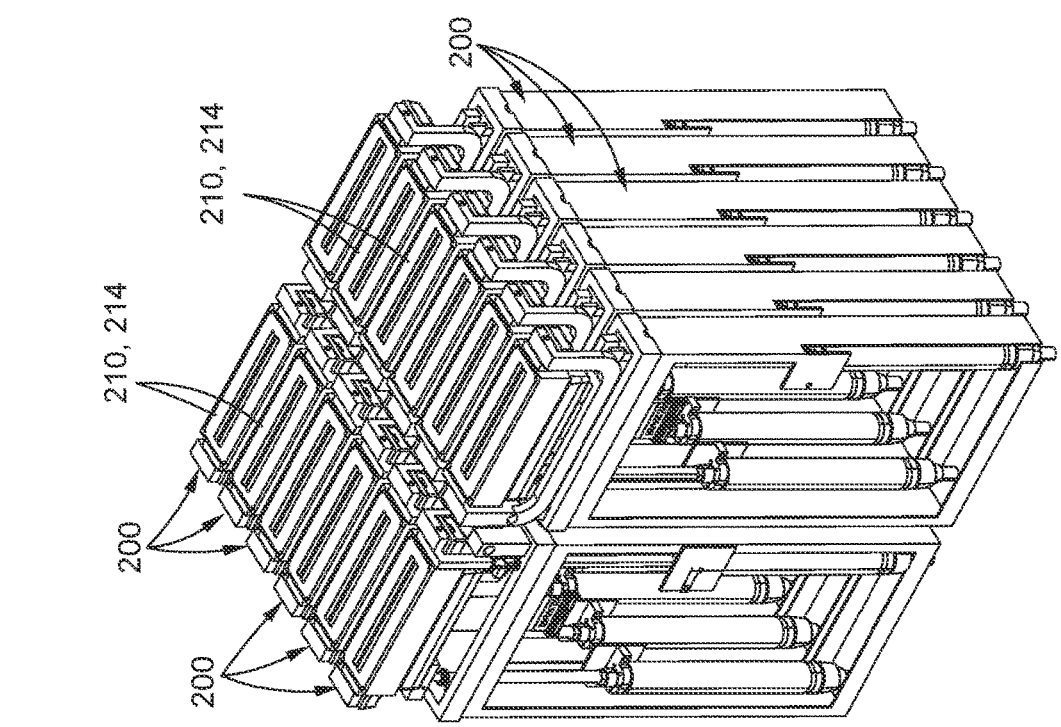
FIG. 9 is a perspective view of the device head assemblies of FIG. 8.
Figure 8:
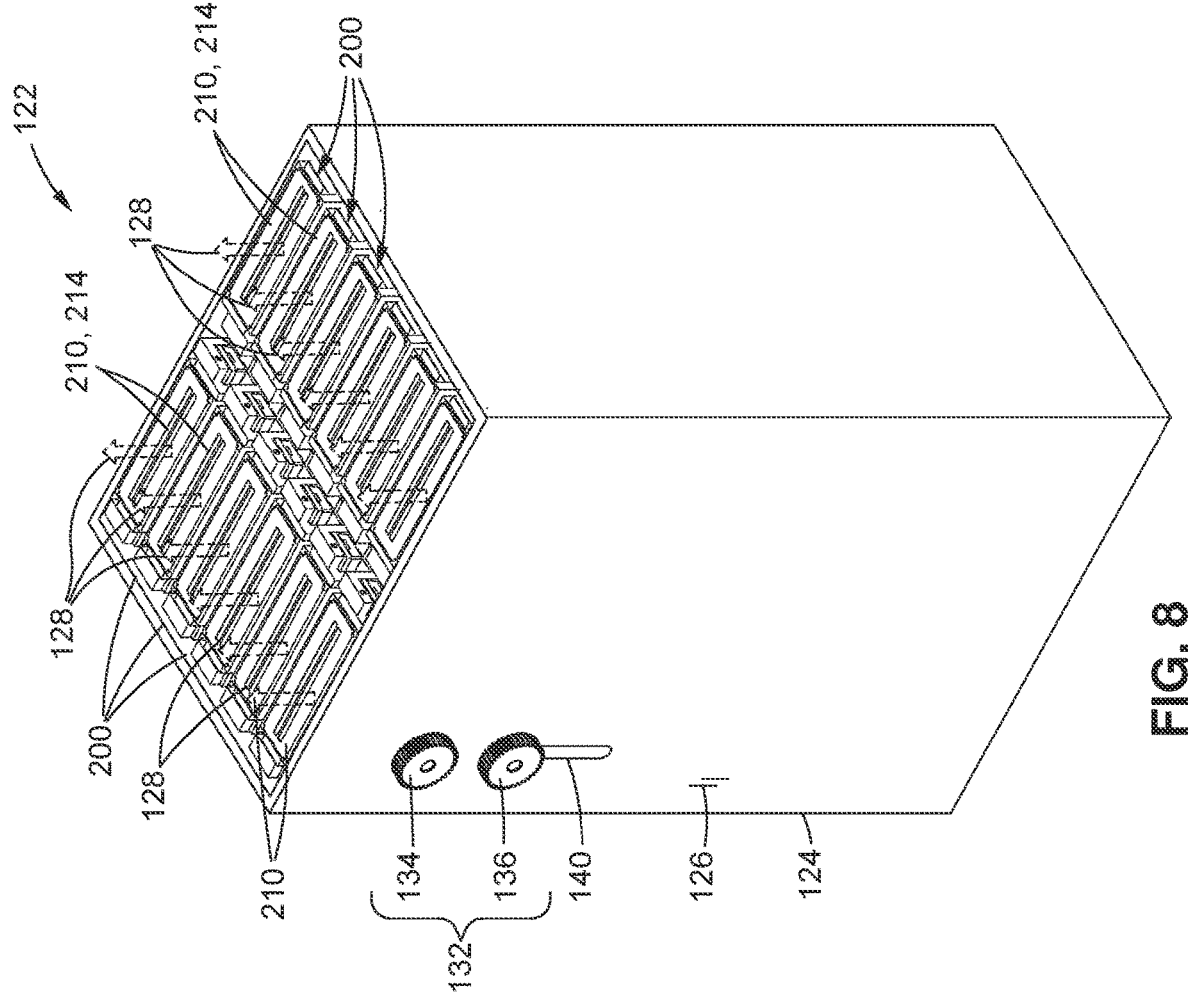
FIG. 8 is a perspective view of an example of a treatment device comprising a device frame containing a plurality of the device heads, and further illustrating a gear system coupled to a lateral side of the device frame.

As shown in FIGS. 7-9 and described in greater detail below, each treatment device 122 includes a device frame 124, and each treatment device 122 has one or more device heads 210, which are shown arranged in rows and columns, and which are supported by the device frame 124. As described in greater detail below, each device head 210 includes a pitch-yaw actuation system 230 (FIG. 14) for pivoting the device head 210 about a pitch axis 240 (FIGS. 10-13) and a yaw axis 282 (FIGS. 10-13). The pitch-yaw actuation system 230 of each device head 210 is configured to orient the device head 210 complementary (e.g., locally normal) to the contour of an area of the article surface 422 (FIG. 1) immediately adjacent to the device head 210 as the treatment devices 122 are moved over the article 420 (FIG. 1).

Each of the device heads 210 is configured to dispense a treatment (not shown) toward and/or onto an article surface 422. The treatment may be a coating, such as a primer, a paint, a clear coat, or a sealant. For painting an article 420 such as the fuselage 426 shown in FIGS. 1-4, each of the device heads 210 is an inkjet printhead 214 (e.g., a piezo-electric printhead or a thermal printhead) configured to precisely dispense ink onto the surfaces of the fuselage 426 as the treatment devices 122 are moved along the fuselage 426 for printing an aircraft livery. In other examples, the device heads 210 may be configured to dispense other types of treatments or substances, such as a solvent, an adhesive, a lubricant, abrasive particles, or any type of gas, liquid, semi-solid, or solid (e.g., particles) substance. In still further examples, the device heads 210 may be configured to emit radiation (e.g., electromagnetic radiation) for performing any one of a variety of operations on an article surface 422.

Although described in the context of treating the surfaces of a fuselage 426, the treatment device system 100 may be implemented for treating any one of a variety of different types of articles 420, and is not limited to treating an aircraft 424. For example, the treatment device system 100 may be implemented for treating vehicles such as ships, trains, or other ground-based motor vehicles such as trucks and automobiles. In addition, the treatment device system 100 may be implemented for treating stationary objects including, but not limited to, buildings, architectural objects, walls, and/or any one of a variety of other types of structures, systems, subsystems, assemblies, or subassemblies.

Figure 2:
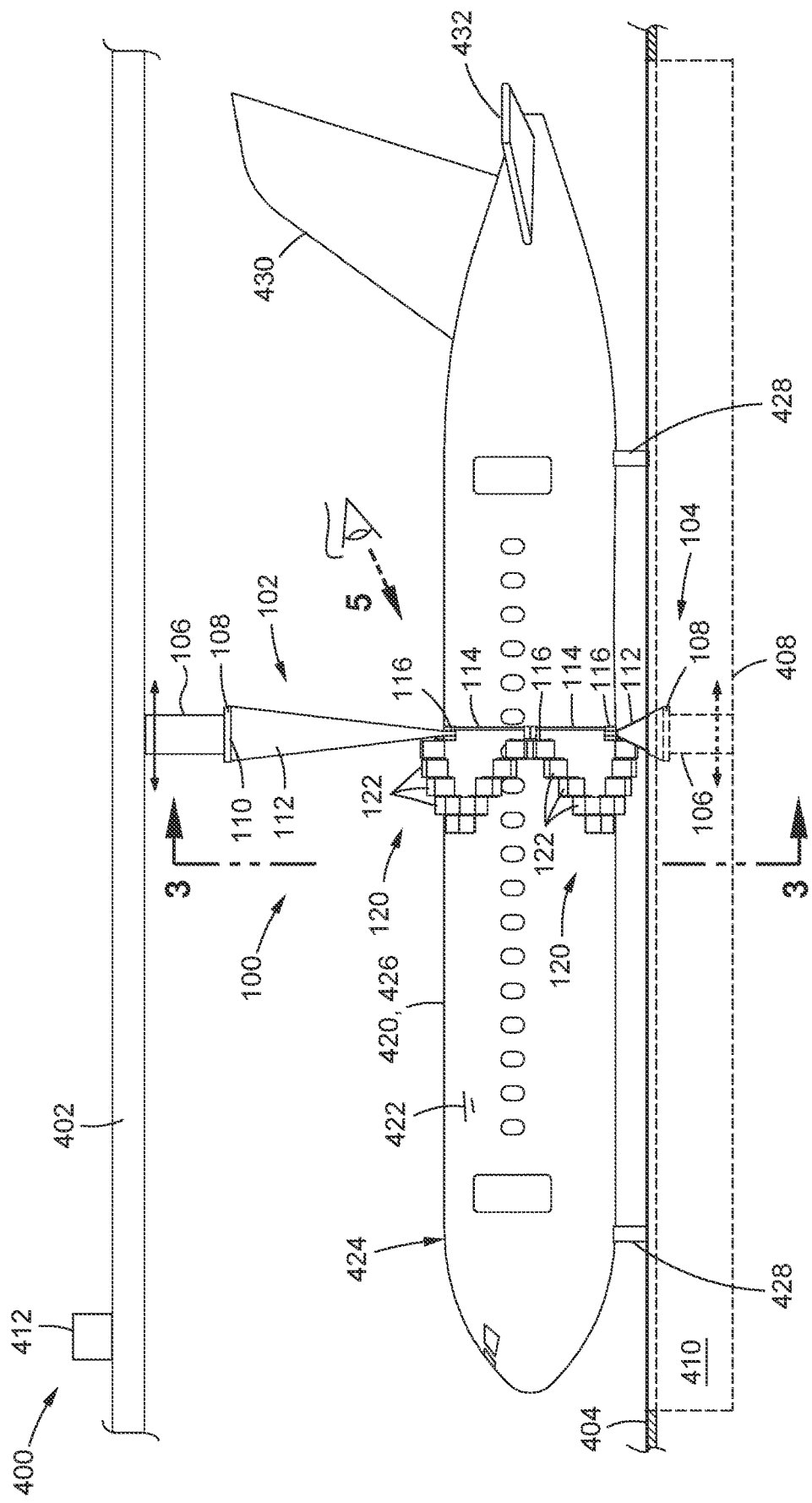
FIG. 2 is a side view of the treatment device system 100 and fuselage of FIG. 1.

In FIGS. 1-4, the upper treatment device support assembly 102 includes a central pillar 106 coupled to an overhead gantry 402 (FIG. 2). The fuselage 426 is oriented parallel to the lengthwise direction of the overhead gantry 402, allowing the upper treatment device support assembly 102 to move the treatment devices 122 along the length of the fuselage 426. A support structure base 108 is shown coupled to the central pillar 106. On each of opposing sides of the support structure base 108 is a pillar pivot joint 110 coupling an attachment pillar 112 to the support structure base 108. At the lower end of each attachment pillar 112 is an arm pivot joint 116 coupling a pair of attachment arms 114 to the attachment pillar 112. The ends of the attachment arms 114 are respectively coupled via arm pivot joints 116 to opposite sides of an array 120 of treatment devices 122. In the example shown, the upper treatment device support assembly 102 supports two arrays 120 of treatment devices 122.

In FIGS. 1-4, the lower treatment device support assembly 104 is configured similar to the upper treatment device support assembly 102. For example, the lower treatment device support assembly 104 includes a central pillar 106, which is supported on a pit gantry 408 mounted in a pit 410 extending along a lengthwise direction below the floor 404 in parallel relation to the overhead gantry 402. As shown in FIGS. 2-3, a support structure base 108 is mounted on the upper end of the central pillar 106. A pair of pillar pivot joints 110 on opposite sides of the support structure base 108 respectively couple a pair of attachment pillars 112 to the support structure base 108. The attachment pillars 112 extend upwardly through a pair of floor openings 406. At the upper end of each attachment pillar 112 is an arm pivot joint 116 coupling a pair of attachment arms 114 to the attachment pillar 112. The ends of the pair of attachment arms 114 extending from each attachment pillar 112 are coupled to opposite sides of an array 120 of treatment devices 122. The lower treatment device support assembly 104 supports two arrays 120 of treatment devices 122.

Figure 5:
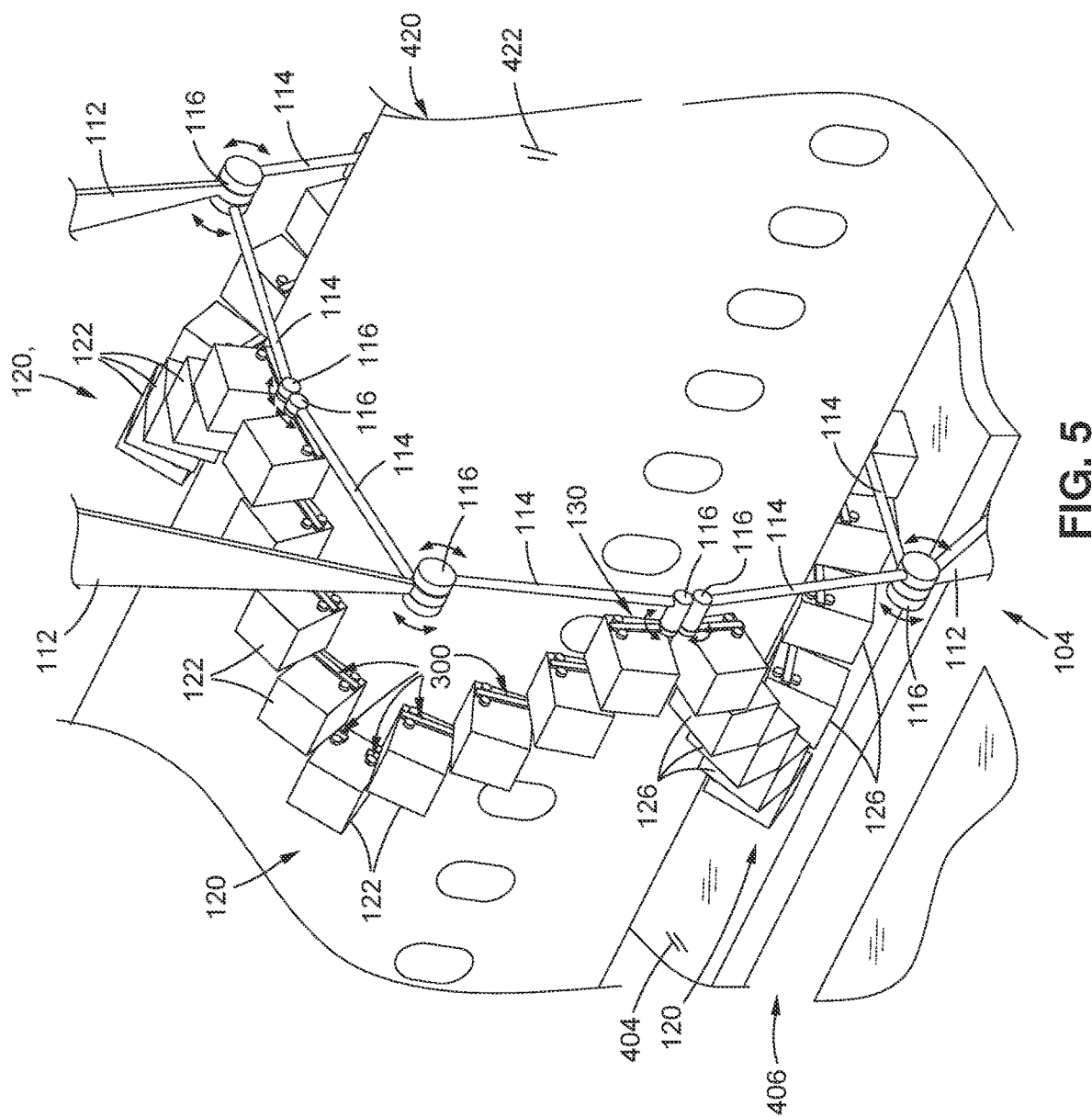
FIG. 5 is a perspective view of the fuselage and the upper and lower treatment device support assemblies taken along line 5 of FIG. 2.
Figure 6:
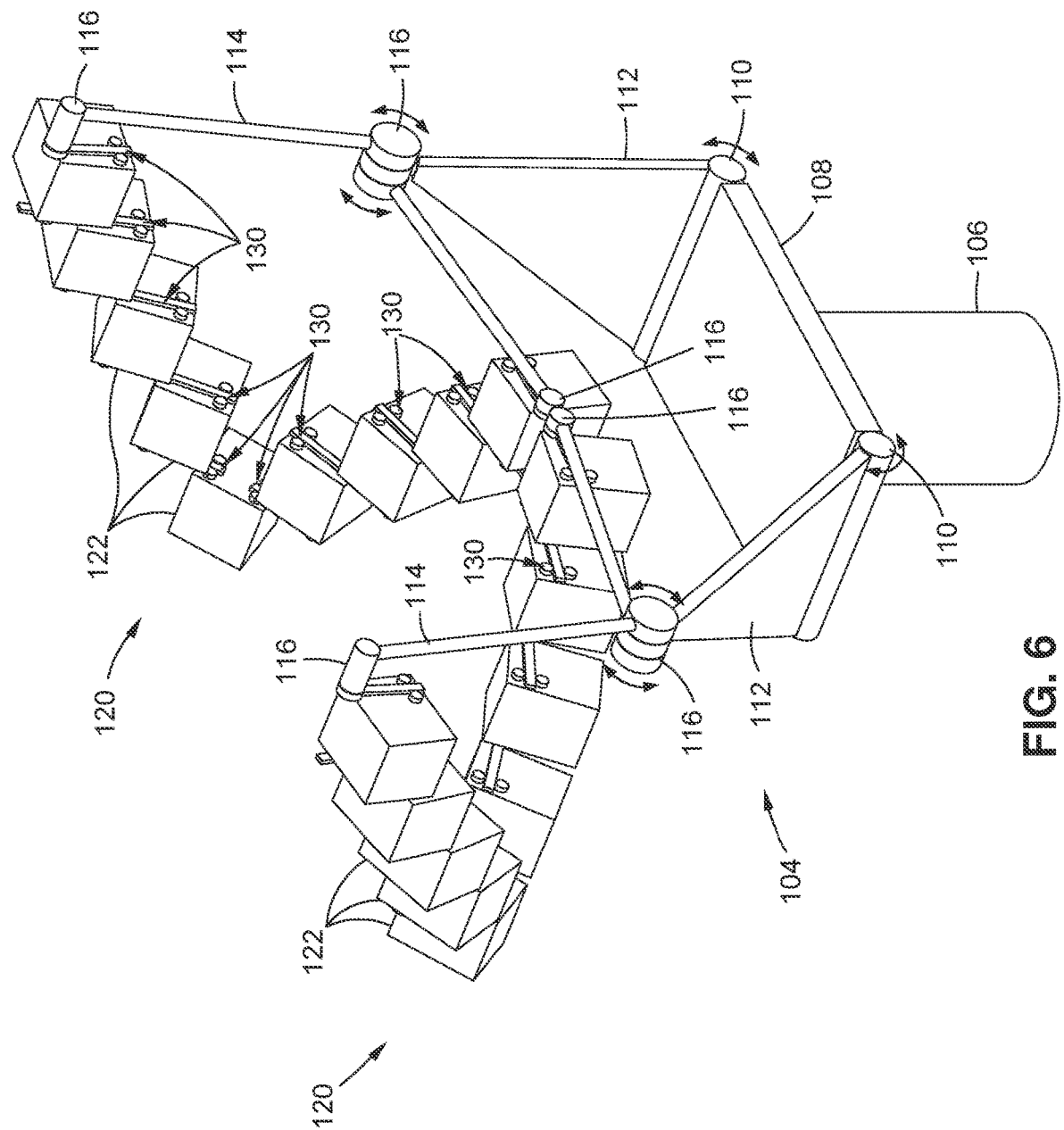
FIG. 6 is a perspective view of the lower treatment device support assembly of FIG. 5.

Referring to FIGS. 4-6, shown is the upper treatment device support assembly 102 supporting two arrays 120 of treatment devices 122. Also shown is the lower treatment device support assembly 104 supporting two arrays 120 of treatment devices 122. To facilitate positioning the treatment devices 122 relative to an article 420, the attachment pillars 112 are rotatable about the pillar pivot joints 110, and the attachment arms 114 are rotatable about the arm pivot joints 116. The pivotability of the attachment pillars 112 and the attachment arms 114 allows the arrays 120 of treatment devices 122 to be positioned complementary to a variety of articles of different sizes and shapes.

Referring to FIG. 7, shown is a single array 120 of treatment devices 122 of the lower treatment device support assembly 104 (FIG. 6). The array 120 is supported on opposite ends respectively by a pair of attachment arms 114. Each treatment device 122 includes a device frame 124. As mentioned above, the device frames 124 of an array 120 are interconnected by device actuation systems 130, which translate and rotate the device frames 124 relative to each other in a manner to position each treatment device 122 at a predetermined distance and orientation relative to the article surface 422.

Each device actuation system 130 includes a drive rail 138 and at least one gear system 132. As shown in FIG. 7, the gear systems 132 respectively of adjacent pairs of treatment devices 122 are respectively mounted to the lateral sides 126 that generally face each other, thereby allowing adjacent pairs of treatment devices 122 to be interconnected by a drive rail 138. Each gear system 132 has a first drive gear 134 and a second drive gear 136. The drive rails 138 (FIG. 7) are captured between the first drive gear 134 and the second drive gear 136 of the adjacent device frames 124. The first drive gear 134 and the second drive gear 136 are each mounted on a drive shaft (not shown) extending through the lateral side 126 of the device frame 124, and are respectively coupled to a first drive gear motor (not shown) and a second drive gear motor (not shown) inside the device frame 124. The shaft of the second drive gear 136 extends through a device frame slot 140 (FIG. 8) in the lateral side 126 of the device frame 124.

To actuate the device frames 124, the first drive gear 134 and the second drive gear 136 of each gear system 132 are rotated at the same or different speeds, and in the same or opposite directions, to cause translation and/or rotation of the device frames 124 relative to each other. The second drive gear 136 moves toward or away from the first drive gear 134 to maintain the second drive gear 136 in continuous engagement with the drive rail 138 against the first drive gear 134 as the device frame 124 rotates relative to the drive rail 138 during differential rotation of the first drive gear 134 and the second drive gear 136.

Referring still to FIG. 7, the device actuation systems 130 move the device frames 124 (i.e., the treatment devices 122) between an expanded configuration (FIG. 7) and a contracted configuration (not shown), and any configuration in between, to allow the array 120 of treatment devices 122 to match the local size, shape, and geometry of an article 420 (FIG. 1) being treated by the treatment device system 100 (FIG. 1). In the expanded configuration, the array 120 of treatment devices 122 has a V-shaped configuration as shown in FIGS. 1-2 and 5-7. The V-shaped configuration may be implemented for livery printing on tubular sections of the fuselage 426 (FIG. 1), and at the nose section of the fuselage 426. To facilitate livery printing at the tail section, an array 120 of treatment devices 122 may be moved into a semi-contracted or contracted configuration to allow the array 120 to fit between the vertical tail 430 (FIG. 1) and one of the horizontal tails 432 (FIG. 1). As may be appreciated, the treatment device system 100 may be operated in a manner to arrange an array 120 of treatment devices 122 in any one of a variety of configurations complementary to other areas of an aircraft 424 in addition to the fuselage 426, such as on opposite sides of the vertical tail 430.

Referring still to FIG. 7, the treatment device system 100 includes a controller 412 (FIG. 2) for controlling the movement of the components of the upper and lower treatment device support assemblies 102, 104. In this regard, the controller 412 controls the pivoting of the attachment pillars 112 about the pillar pivot joints 110, the pivoting of the attachment arms 114 about the arm pivot joints 116, and the movement of the device actuation systems 130 interconnecting the device frames 124, thereby allowing the arrays 120 of treatment devices 122 to accommodate articles 420 (FIG. 1) of different sizes and shapes. In addition, the controller 412 controls the pitch-yaw actuation systems 230 (FIG. 14) for adjusting the pitch orientation and yaw orientation of the individual device heads 210 in each treatment device 122 to be complementary to the local contour of the article 420, as described below.

The upper and lower treatment device support assemblies 102, 104 (FIG. 1) may include one or more sensors (not shown) mounted to the device frames 124 (FIG. 1). The sensors may be provided as imaging devices (e.g., cameras), laser scanners, or other metrology devices configured to sense the article surfaces 422 (FIG. 1). Each sensor is configured to continuously scan the topography of the article surface 422, and continuously generate surface data representative of the local contour of the article surface 422 as the arrays 120 (FIG. 1) of treatment devices 122 (FIG. 1) are moved over the article 420. For example, the sensors on each device frame 124 continuously sense the distance between the device frame 124 and the local article surface 422, in addition to sensing the orientation of the nominal dispensing direction 128 (FIG. 8) of the device heads 210 relative to the local contour of the article surface 422. The nominal dispensing direction 128 may be described as the direction along which a treatment is dispensed from a device head 210 when the device head 210 is in its home position 212 (FIG. 21), prior to pivoting of the device head 210 about the pitch axis 240 (FIGS. 10-13) or yaw axis 282 (FIGS. 10-13) using the pitch-yaw actuation system 230.

The sensors continuously transmit surface data to the controller 412 (FIG. 2). The controller 412 processes the surface data provided by the sensors, and controls the device actuation systems 130 (FIG. 7) to maintain the device head 210 (FIG. 7) of each treatment device 122 within a tolerance band (e.g., ±0.010 inch) of a predetermined distance (e.g., up to 0.20 inch) from the article surface 422 (FIGS. 1-3). In addition, the controller 412 controls the device actuation systems 130 (FIG. 7) to maintain the device frame 124 (FIG. 7) of each treatment device 122 (FIG. 7) at a generally perpendicular (e.g., ±10 degrees) orientation relative to the local contour of the article surface 422.

As shown in FIGS. 7-8 and mentioned above, the device heads 210 in each treatment device 122 are arranged in two columns, resulting in the device heads 210 being positioned in side-by-side arrangement. Due to the side-by-side arrangement of the device heads 210 in each treatment device 122, orienting the device frame 124 generally perpendicular to a curved article surface 422 (FIG. 1) will result in at least one of the side-by-side device heads 210 being non-perpendicular to the local contour of the article surface 422. Furthermore, the device actuation system 130 of each treatment device 122 is limited to rotating the device frame 124 about an axis (not shown) perpendicular to the device frame 124 lateral side 126 that contains the gear system 132, and is incapable of rotating the device frame 124 about an axis (not shown) parallel to the lateral side 126 of the device frames 124 to accommodate the compound curvature of an article surface 422.

Advantageously, the pitch-yaw actuation system 230 (FIG. 10) disclosed herein provides the capability to adjust the pitch orientation and yaw orientation of each device head 210, so that the dispensing direction 128 of each device head 210 can be oriented complementary to (e.g., perpendicular to) the local contour of the article 420. More specifically, the pitch-yaw actuation system 230 of each device head 210 has the capability to pivot the device head 210 about a yaw axis 282 (FIG. 10) that is parallel to the lateral side 126 of the device frame 124. In addition, the pitch-yaw actuation system 230 of each device head 210 has the capability to pivot the device head 210 about a pitch axis 240 (FIG. 10) oriented orthogonal to the yaw axis 282. The combination of pivoting about the yaw axis 282 and pivoting about the pitch axis 240 allows the pitch-yaw actuation systems 230 to orient the dispensing direction 128 of each device head 210 to be locally perpendicular or normal to the area of the article surface 422 immediately adjacent to (i.e., directly underneath) the device head 210.

Referring to FIGS. 8-9, shown is a treatment device 122 comprising a device frame 124 containing a plurality of device head assemblies 200 arranged in columns and rows, and which are packed in close proximity to each other within the device frame 124. Although the present example shows two columns and six rows of device head assemblies 200, a treatment device 122 may include any number of columns and any number of rows of device head assemblies 200, including a single column and/or a single row. As mentioned above, a gear system 132 is coupled to the lateral side 126 of the device frame 124 for actuation of the device frame 124 relative to an adjacent device frame 124 via one of the device actuation systems 130 (FIG. 7).

Figure 11:
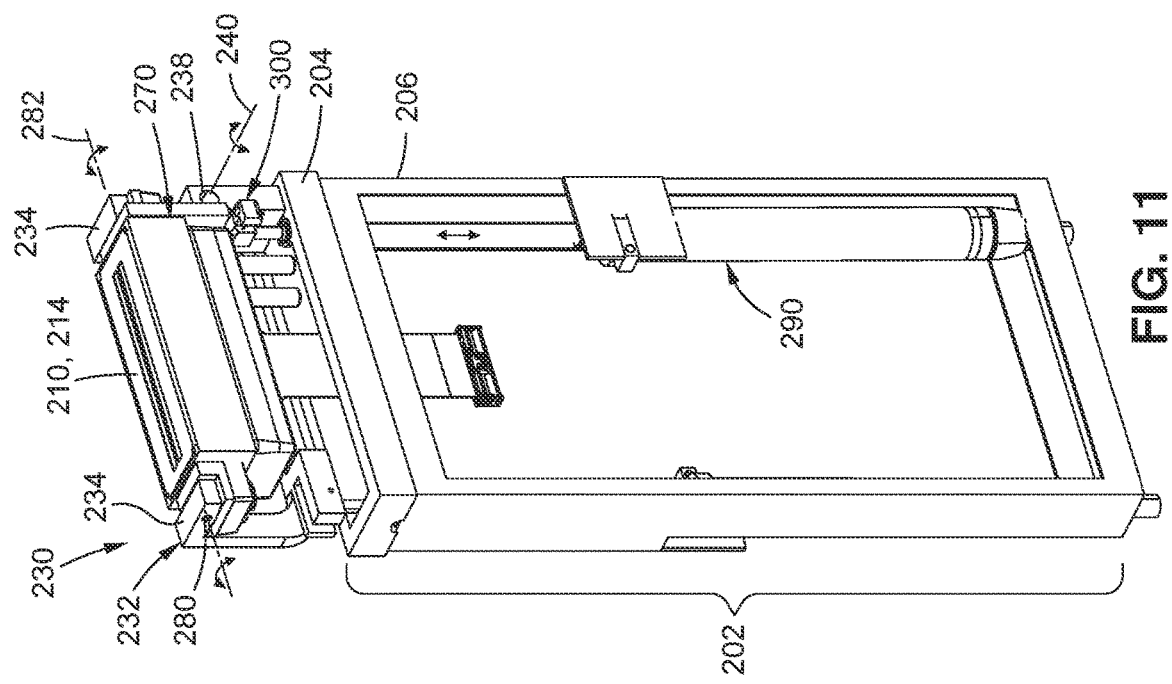
FIG. 11 is an aft perspective view of the device head assembly of FIG. 10.
Figure 10:
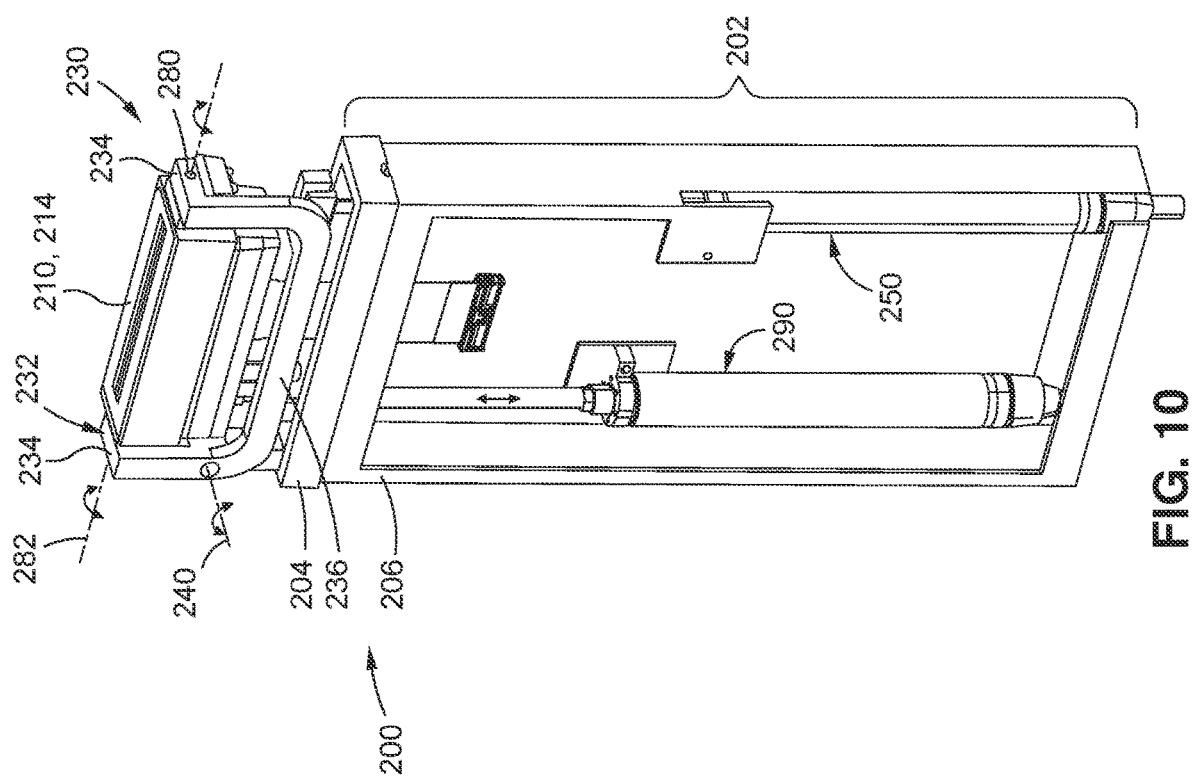
FIG. 10 is a front perspective view of an example of one of the device head assemblies of FIG. 8, and illustrating an example of a pitch-yaw actuation system mounted on a head frame.
Figure 13:
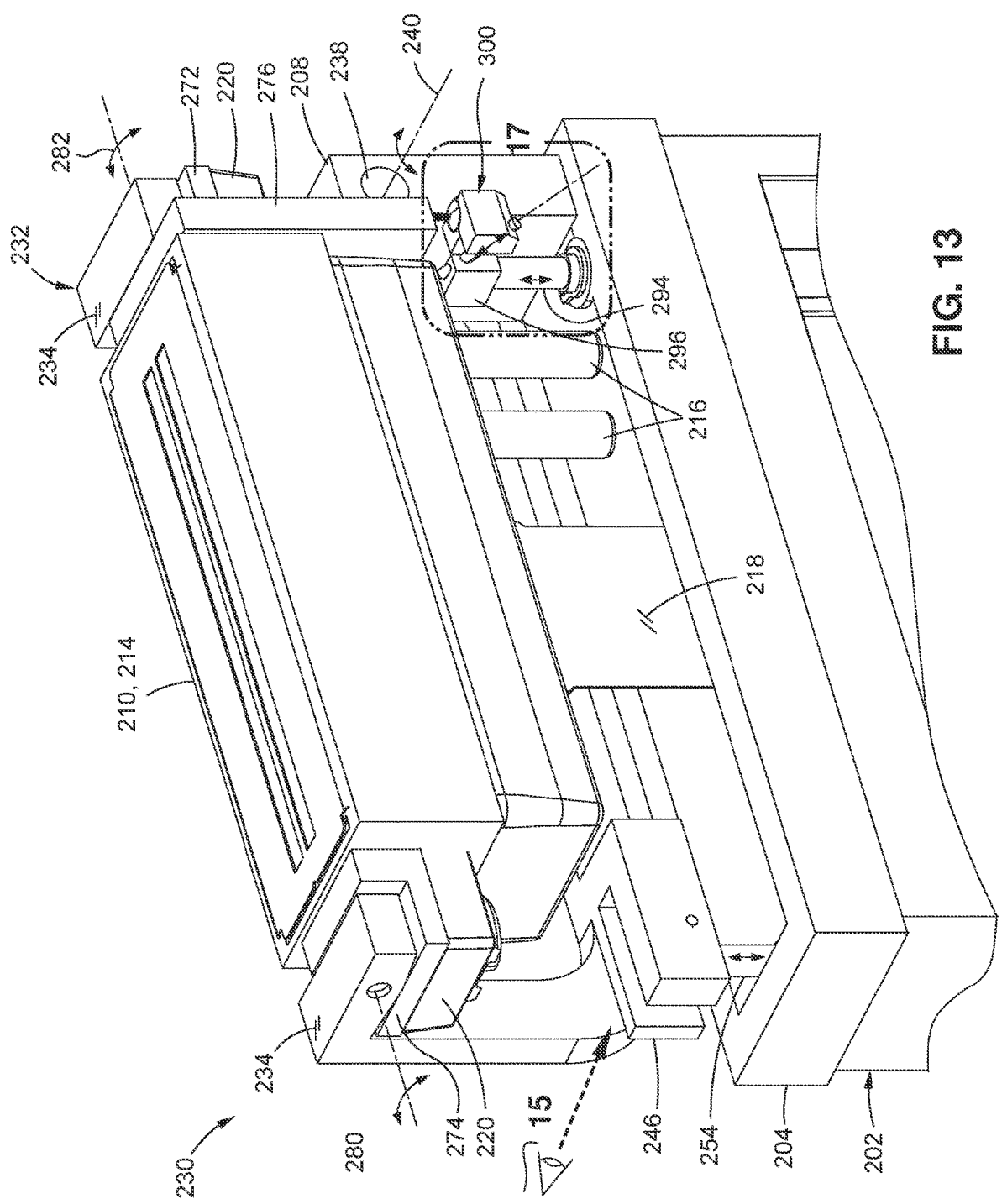
FIG. 13 is a rear perspective view of the pitch-yaw actuation system supporting a device head.

Referring to FIGS. 10-11, shown is one of the device head assemblies 200 of FIGS. 8-9. The device head assembly 200 includes a head frame 202 and a pitch-yaw actuation system 230. In the example shown, the head frame 202 is generally hollow and has an orthogonal shape having a long depth relative to the length and width that define the cross-sectional shape of the head frame 202. The head frame 202 has a head frame upper portion 204 and a head frame lower portion 206. As described below, the pitch-yaw actuation system 230 is configured in a manner that capitalizes on the relatively long depth of the head frame 202, and allows for a relatively large number of device head assemblies 200 (FIG. 8) to be packed within a single device frame 124 (FIG. 8).

Figure 14:
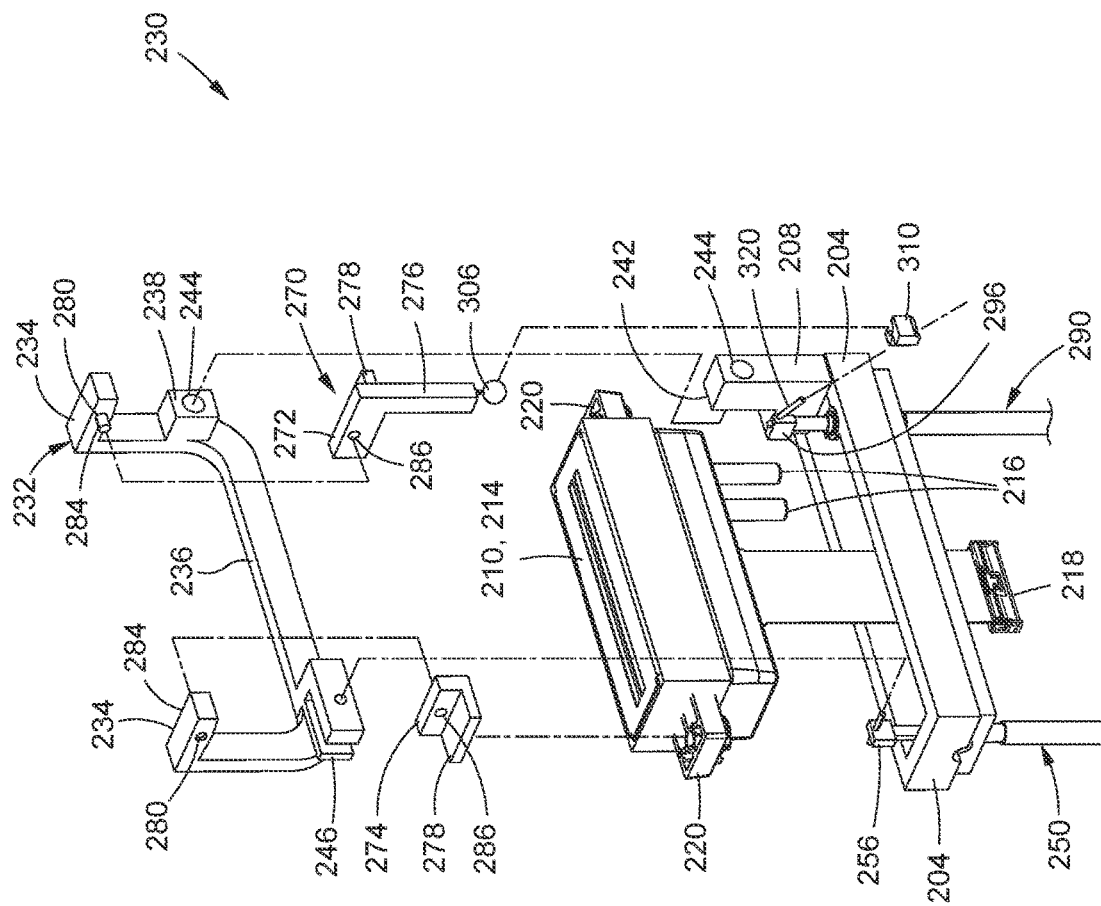
FIG. 14 is an exploded view of the pitch-yaw actuation system illustrating the interconnection of components of the pitch-yaw actuation system, including a yaw frame, a yaw actuator, a pitch frame, a pitch actuator, and a universal joint assembly.

The pitch-yaw actuation system 230 is mounted on the head frame upper portion 204. A device head 210 is supported by the pitch-yaw actuation system 230. As mentioned above, the device head 210 is configured to dispense a treatment along a dispensing direction 128 (FIG. 8) of the device head 210. In the example shown, the device head 210 is an inkjet printhead 214 configured to dispense ink. As shown in FIG. 14, the inkjet printhead 214 includes a pair of fluid conduits 216 for supplying and returning ink to and from the inkjet printhead 214. A flexible data cable 218 extends from the underside of the inkjet printhead 214 for controlling the operation of the inkjet printhead 214. Although the pitch-yaw-actuation system is described in the context of supporting an inkjet printhead 214, the pitch-yaw actuation system 230 can support any one of a variety of different types of device heads 210.

Referring to FIGS. 10-16, the pitch-yaw actuation system 230 includes a pitch frame 232, a yaw frame 270, a pitch actuator 250, a yaw actuator 290, and a universal joint assembly 300. The pitch frame 232 is pivotably coupled to the device frame 124 via a pitch hinge 238. More specifically, the pitch hinge 238 pivotably couples the pitch frame 232 to the head frame 202, and the head frame 202 is mountable to (i.e., inside) the device frame 124 as shown in FIG. 8. The pitch hinge 238 has a pitch axis 240. As shown in FIG. 14, the pitch frame 232 includes a pair of pitch frame tabs 234 interconnected by a pitch frame connecting member 236. The pitch frame tabs 234 are spaced apart from each other to define a pitch frame opening that is sized and configured to receive the device head 210. The pitch frame connecting member 236 is shaped in a manner to avoid interfering with the pivoting of the device head 210 about the yaw axis 282.

In the example shown, the pitch hinge 238 is integrated into the pitch frame 232 and the device frame 124. For example, in FIG. 14, the pitch hinge 238 includes a pitch hinge bore 244 formed in a head frame hinge post 208 extending upwardly from the head frame upper portion 204. A pitch hinge bore 244 is also formed in the pitch frame 232. A pitch hinge pin 242 extends through the pitch hinge bores 244 to thereby couple the pitch frame 232 to the head frame 202. However, in another example not shown, the pitch-yaw actuation system 230 may include a pitch hinge 238 as a separate component coupling the pitch frame 232 to the head frame 202.

The yaw frame 270 is pivotably coupled to the pitch frame 232 via a pair of yaw hinges 280 that define the yaw axis 282. The yaw frame 270 is made up of a yaw frame first portion 272 and a yaw frame second portion 274, which are separate members. The yaw frame first portion 272 and the yaw frame second portion 274 each have a yaw frame tab 278. In addition, the yaw frame first portion 272 has a yaw frame arm 276 which extends downwardly from the yaw frame tab 278. The yaw frame first portion 272 is pivotably coupled to the pitch frame tab 234 via a yaw hinge 280 on one side of the device head 210. Likewise, the yaw frame second portion 274 is pivotably coupled to the pitch frame tab 234 via a yaw hinge 280 on an opposite side of the device head 210. Each yaw hinge 280 includes yaw hinge pin 284 that extends into a yaw hinge bore 286 formed in the yaw frame first portion 272 or yaw frame second portion 274. The pitch-yaw actuation system 230 is configured such that the yaw axis 282 (FIGS. 10-13) is orthogonal to the pitch axis 240 (FIGS. 10-13).

Figure 20:
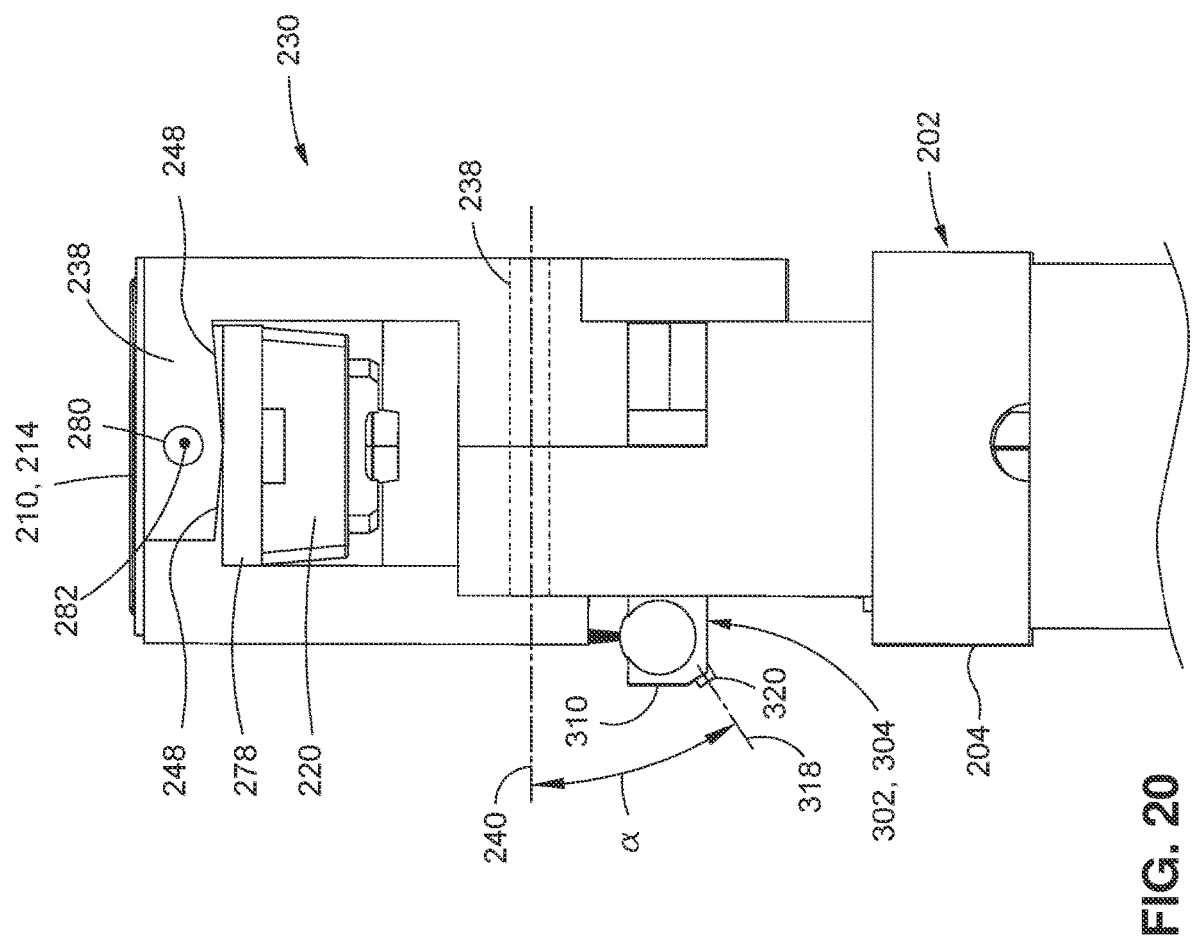
FIG. 20 is a side view of the pitch-yaw actuation system taken along line 20-20 of FIG. 16.

In the example shown, the device head 210 includes a pair of device head mounting tabs 220 for attaching the device head 210 to the yaw frame tabs 278 respectively of the yaw frame first portion 272 and the yaw frame second portion 274. As shown in FIG. 20 and described below, each pitch frame tab 234 has a pair of pivot stops 248 on opposite sides of the yaw axis 282. In the example shown, the pivot stops 248 are angled surfaces on the underside of each pitch frame tab 234. During pivoting of the device head 210 about the yaw axis 282 (FIGS. 10-13), the upper surfaces of the yaw frame tabs 278 make contact with the pivot stops 248, thereby limiting the range of pivoting motion of the device head 210, and which may advantageously prevent the fluid conduits 216 (FIG. 14) and data cable 218 (FIG. 14) of the inkjet printhead 214 from contacting the inner sides of the head frame upper portion 204 during pivoting of the device head 210 about the yaw axis 282.

As described above, the yaw hinges 280 are integrated into the yaw frame 270 and pitch frame 232. However, in another example not shown, the yaw hinges 280 may be separate components from the yaw frame 270 and pitch frame 232. In a still further example not shown, the yaw frame first portion 272 and the yaw frame second portion 274 may be interconnected by a yaw frame connecting member (not shown), which is preferably shaped in a manner to avoid interfering with pivoting of the device head 210 about the yaw axis 282.

Referring still to FIGS. 10-16, the pitch actuator 250 is configured to pivot the pitch frame 232 (and the device head 210) about the pitch axis 240. The pitch actuator 250 is configured as a linear actuator 260 having an actuator axis 258 (FIG. 12) extending along a depthwise direction of the head frame 202. The pitch actuator 250 is located on a pitch actuator side of the device head assembly 200. The actuator axis 258 of the pitch actuator 250 is oriented orthogonal to both the pitch axis 240 and the yaw axis 282.

Figure 15:
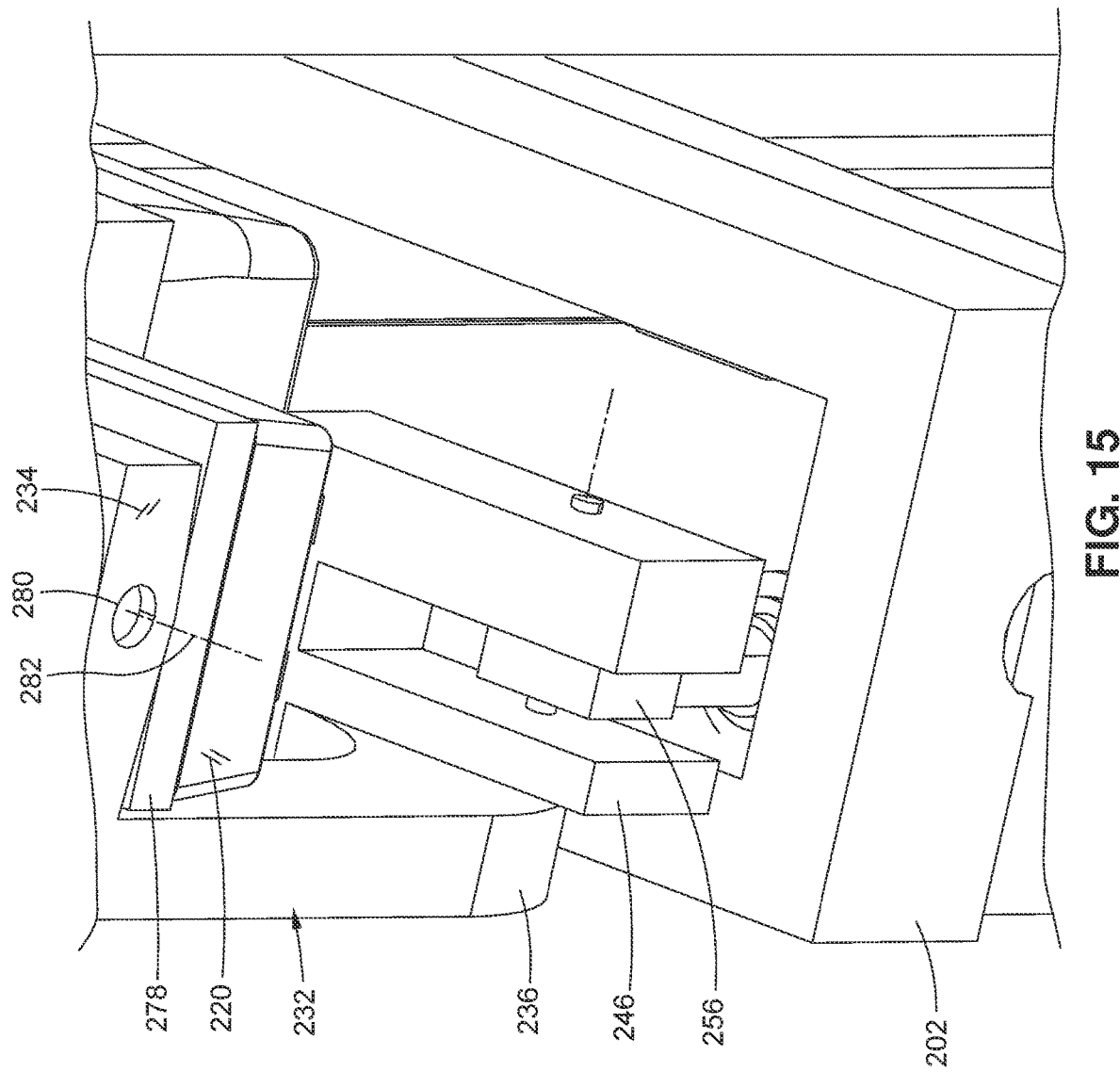
FIG. 15 is a perspective view taken along line 15 of FIG. 13 and illustrating an example of the pitch actuator terminal end coupled to the pitch frame.

The pitch actuator 250 has a pitch actuator fixed portion 252 and a pitch actuator extendable portion 254. The pitch actuator fixed portion 252 is fixedly couplable to the head frame 202 (FIG. 10). The pitch actuator extendable portion 254 is axially movable for pivoting the device head 210 about the pitch axis 240. The pitch actuator extendable portion 254 has a pitch actuator terminal end 256 (FIG. 14) that is coupled to the pitch frame 232 on a side of the device head 210 opposite the pitch hinge 238. As shown in FIG. 15, the pitch actuator terminal end 256 is coupled to a clevis fitting 246 protruding from the pitch frame connecting member 236.

The yaw actuator 290 is configured to pivot the yaw frame 270 (and the device head 210) about the yaw axis 282. In the example shown, the yaw actuator 290 is configured as a linear actuator 260 similar to the pitch actuator 250. The yaw actuator 290 and the pitch actuator 250 are located on opposite sides of the head frame 202. The yaw actuator 290 has an actuator axis 258 oriented orthogonal to both the pitch axis 240 and the yaw axis 282. In addition, the actuator axis 258 of the yaw actuator 290 is generally parallel to the actuator axis 258 of the pitch actuator 250.

Similar to the above-described arrangement of the pitch actuator 250, the yaw actuator 290 has a yaw actuator fixed portion 292 and a yaw actuator extendable portion 294. The yaw actuator fixed portion 292 is fixedly couplable to the head frame 202. The yaw actuator 290 has a yaw actuator terminal end 296 that is coupled to the yaw frame arm 276 via the universal joint assembly 300, as described in greater detail below.

In the example shown, the pitch actuator 250 and the yaw actuator 290 are each configured as an electric linear actuator 260 (FIG. 12) having a small servomotor (not shown) driving a ballscrew mechanism (not shown). The servomotor and the ballscrew mechanism are contained within a cylindrical housing 262 (FIG. 12). In addition, each electric linear actuator 260 has a pushrod 264 (FIG. 12) which is threadably engaged to the ballscrew mechanism, and which extends out of the housing 262. The housing 262 may be coupled to the head frame 202 via a gimbal mount (not shown). Rotation of the ballscrew mechanism via the servomotor causes axial motion of the pushrod 264 relative to the housing 262 for pivoting the device head 210 about the pitch axis 240 and yaw axis 282. Although described as electric linear actuators, the pitch actuator 250 and the yaw actuator 290 may optionally be configured as a pneumatic linear actuator.

Referring to FIGS. 12-14 and 16-20, shown is an example of a universal joint assembly 300 coupling the yaw actuator 290 to the yaw frame 270. The universal joint assembly 300 includes a linear guide mechanism 316 and a universal joint 302. The linear guide mechanism 316 has a guide mechanism axis 318. The universal joint 302 is slidably coupled to the linear guide mechanism 316. The guide mechanism axis 318 is oriented at an angle that allows the universal joint 302 to move along the linear guide mechanism 316 in a manner accommodating misalignment of the yaw actuator 290 with the yaw frame 270 during pivoting of the pitch frame 232 and/or yaw frame 270. For example, the linear guide mechanism 316 is configured to allow the universal joint 302 to translate along the linear guide mechanism 316 while the universal joint 302 rotates. In this manner, the universal joint assembly 300 allows simultaneous pivoting of the device head 210 about the pivot axis and the yaw axis 282.

In the example of FIGS. 16-20, the universal joint 302 is a ball-and-socket joint 304. The ball-and-socket joint 304 includes a ball 306 having a spherical shape, and a joint body 310 having a socket 314 configured to receive the ball 306. The ball 306 is fixedly coupled to an end of the yaw frame arm 276 via a ball stud 308. However, the universal joint 302 may be provided in any one of a variety of alternative configurations that provide universal rotation capability. For example, although not shown, the universal joint 302 may be configured as a Hooke joint comprised of two yoke fittings interconnected by a cross-shaped member, with one of the yoke fittings slidably coupled to the linear guide mechanism 316, and the other yoke fitting fixedly coupled to the yaw frame arm 276.

In FIGS. 18-19, the linear guide mechanism 316 is a guide pin 320 that is fixedly coupled to the yaw actuator terminal end 296. The joint body 310 includes a guide pin bore 322 that is sized and configured to slidably receive the guide pin 320. The joint body 310 has a joint body side face 312 (FIG. 18) configured complementary to a terminal end side face 298 (FIG. 19) of the yaw actuator terminal end 296. During sliding movement of the joint body 310 along the guide pin 320, the joint body side face 312 slides in close parallel (e.g., non-contacting) relation to the terminal end side face 298, thereby preventing rotation of the joint body 310 about the guide pin 320, which may otherwise complicate the dynamics for controlling yaw pivoting of the device head 210.

Although the figures illustrate the guide pin 320 fixedly coupled to the yaw actuator terminal end 296, and the guide pin bore 322 formed in the joint body 310, in other examples not shown, the guide pin 320 may be fixedly coupled to the joint body 310, and the guide pin bore 322 may be formed in the yaw actuator terminal end 296. In another arrangement not shown, the ball 306 of the ball-and-socket joint 304 may be fixedly coupled to the yaw actuator terminal end 296, and the guide pin 320 may be coupled to the yaw frame 270. In such an arrangement, the guide pin 320 may be either fixedly coupled to the yaw frame arm 276 and slidable within a guide pin bore 322 in the joint body 310, or the guide pin 320 may be fixedly coupled to the joint body 310 and slidable within a guide pin bore 322 in the yaw frame arm 276.

Figure 16:
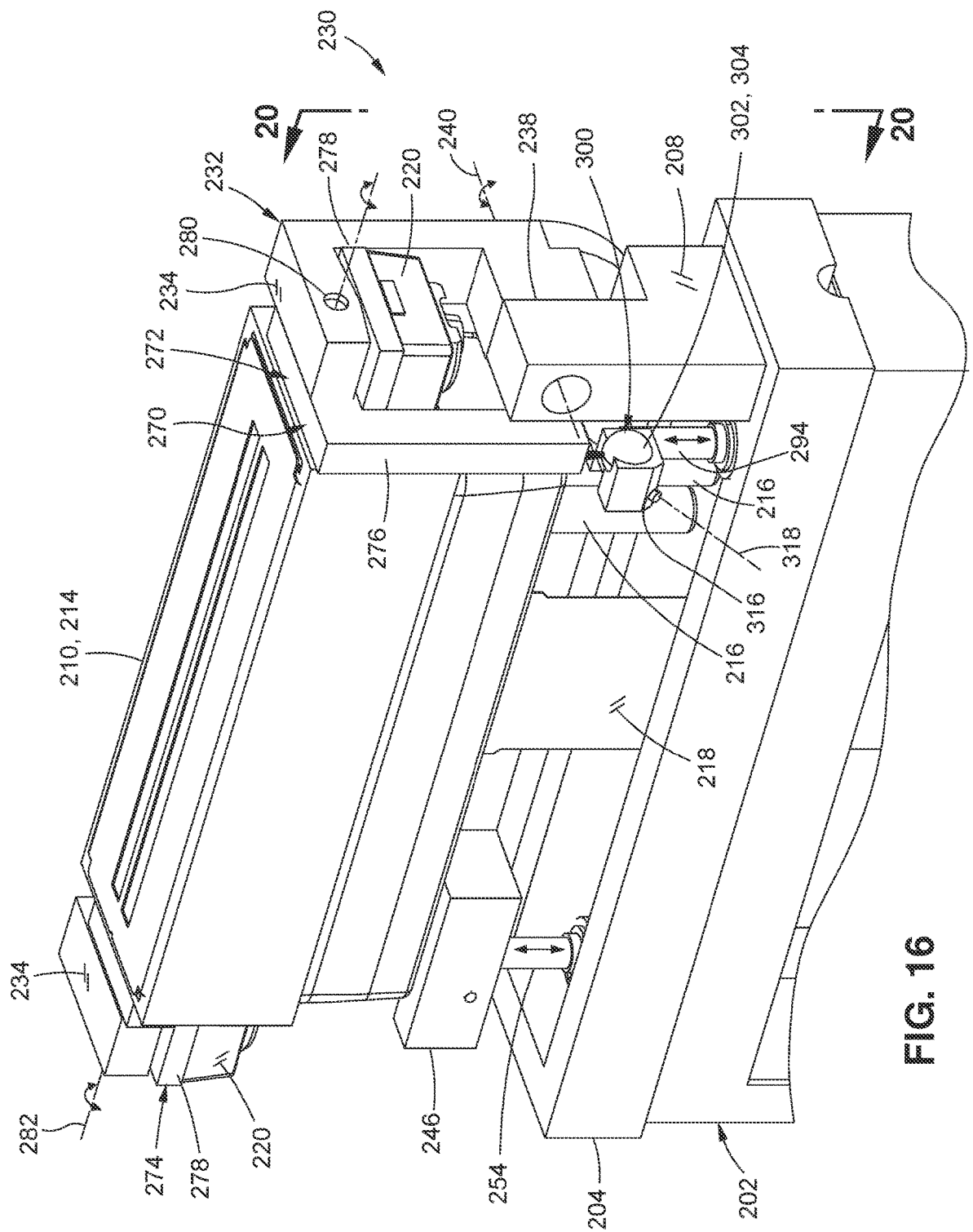
FIG. 16 is a front perspective view of the pitch-yaw actuation system supporting a device head.

Referring to FIG. 20, which illustrates the pitch-yaw actuation system 230 viewed from the side, the guide mechanism axis 318 (e.g., the guide pin 320) is oriented at an angle that allows the universal joint 302 (e.g., the joint body 310) to move along the linear guide mechanism 316 in a manner accommodating misalignment of the yaw actuator 290 (FIG. 17) with the yaw frame 270 (FIG. 17) during pivoting of the pitch frame 232 (FIG. 16) and/or the yaw frame 270 (FIG. 16). Although not shown, the guide mechanism axis 318 is parallel to the pitch axis 240 when the pitch-yaw actuation system 230 is viewed along a direction parallel to the pitch axis 240.

In FIG. 20, the guide mechanism axis 318 is oriented at an acute angle relative to the pitch axis 240 when the pitch-yaw actuation system 230 is viewed along a direction parallel to the yaw axis 282. In one example, the acute angle α of the guide mechanism axis 318 is approximately 45 degrees (e.g., ±20 degrees). However, the guide mechanism axis 318 may be oriented in any one of a variety of different directions that accommodates misalignment of the yaw actuator 290 with the yaw frame 270 during pivoting motion of the device head 210.

Referring still to FIG. 20, when the pitch-yaw actuation system 230 is viewed from the side, the universal joint assembly 300 is located below the pitch hinge 238, which is located below the yaw hinge 280. However, in other examples not shown, the pitch-yaw actuation system 230 may be configured such that the universal joint assembly 300 is located between the pitch hinge 238 and the yaw hinge 280 when the pitch-yaw actuation system 230 is viewed from the side. Also shown in FIG. 20 are the above-mentioned pivot stops 248 incorporated into the pitch frame tabs 234 for limiting the range of pivoting motion of the device head 210 in either direction about the yaw axis 282.

Figure 21:
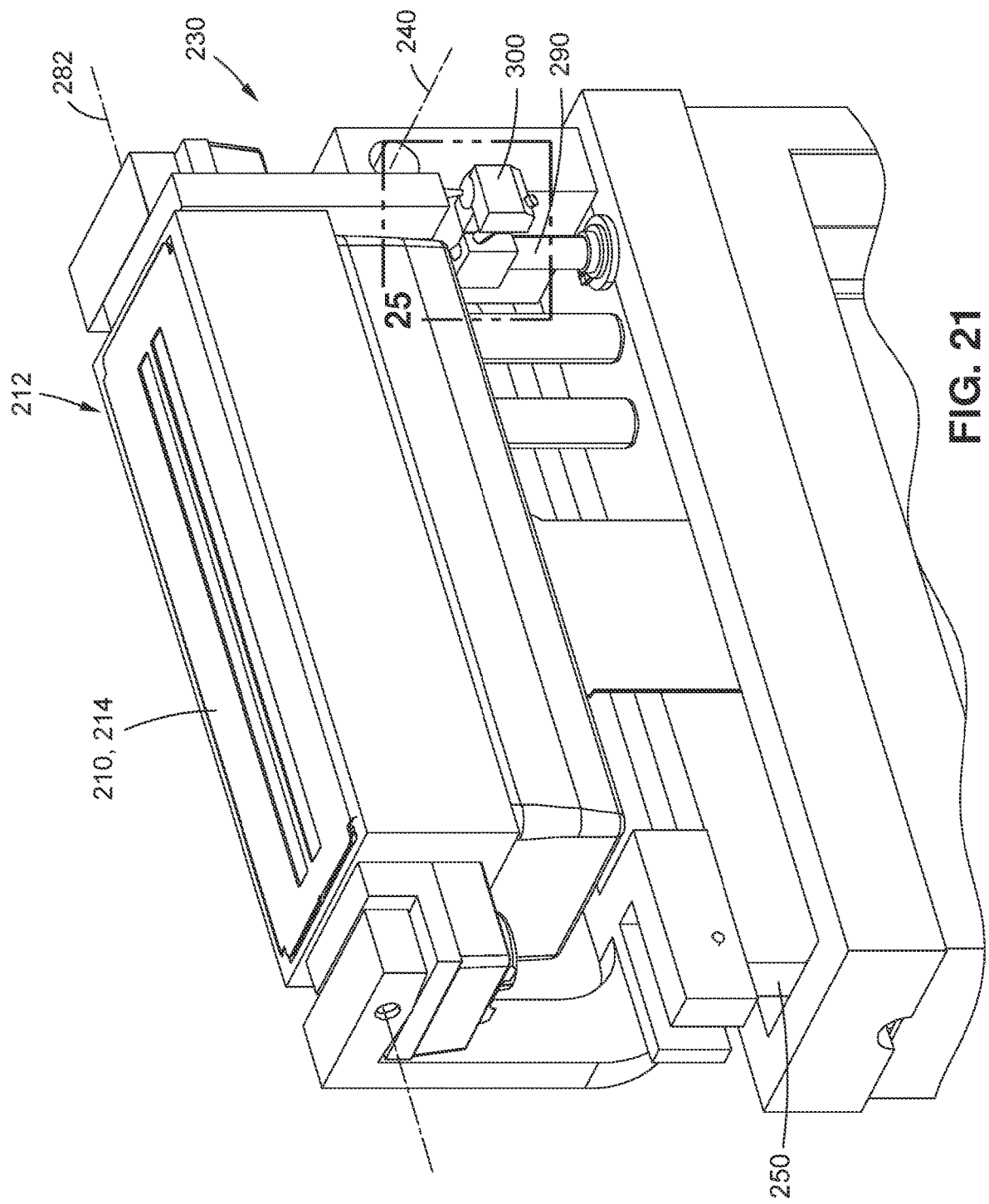
FIG. 21 is a perspective view of the pitch-yaw actuation system supporting the device head in a home position.
Figure 23:
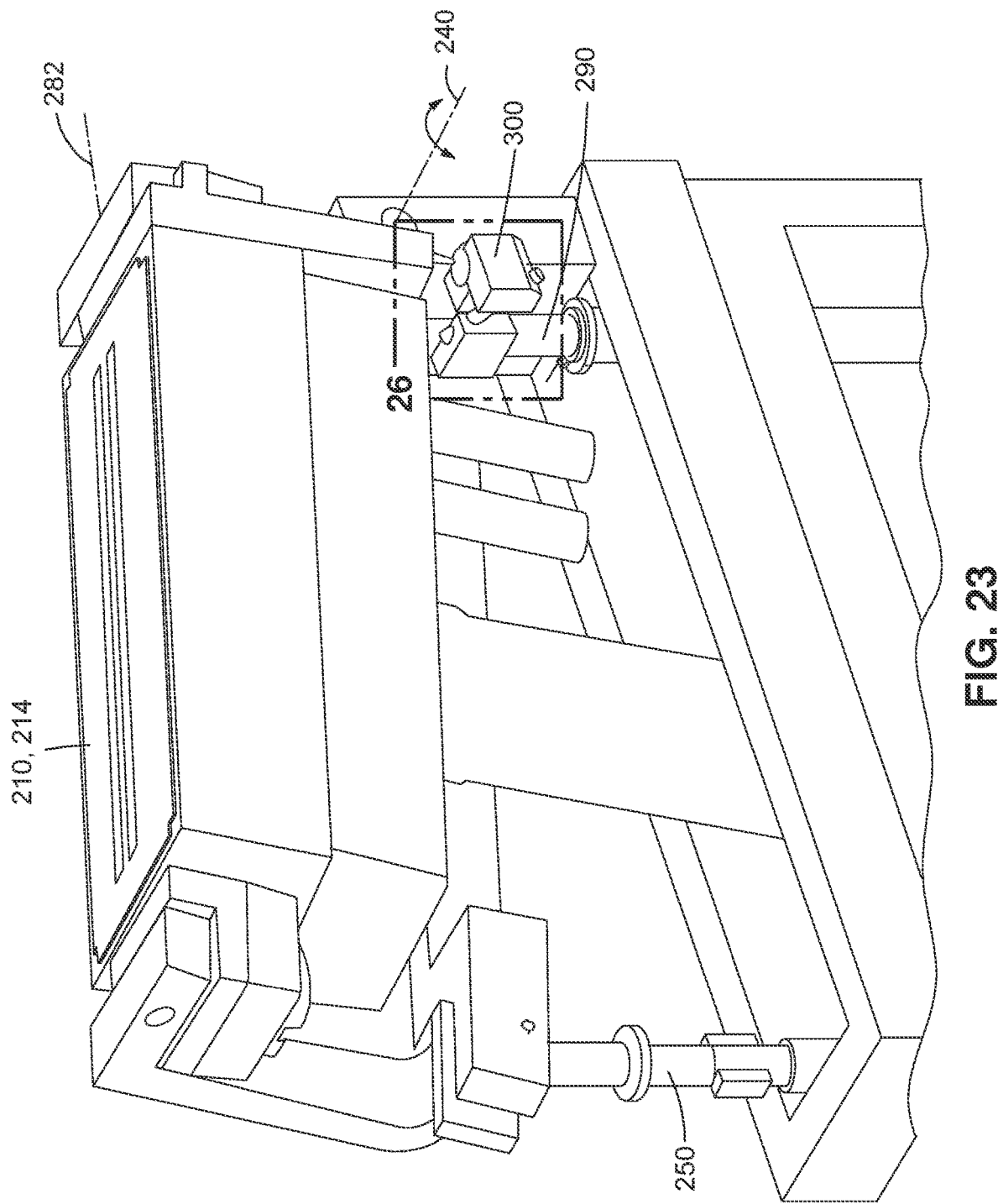
FIG. 23 is a perspective view of the pitch actuator pivoting the device head upwardly about the pitch axis.
Figure 24:
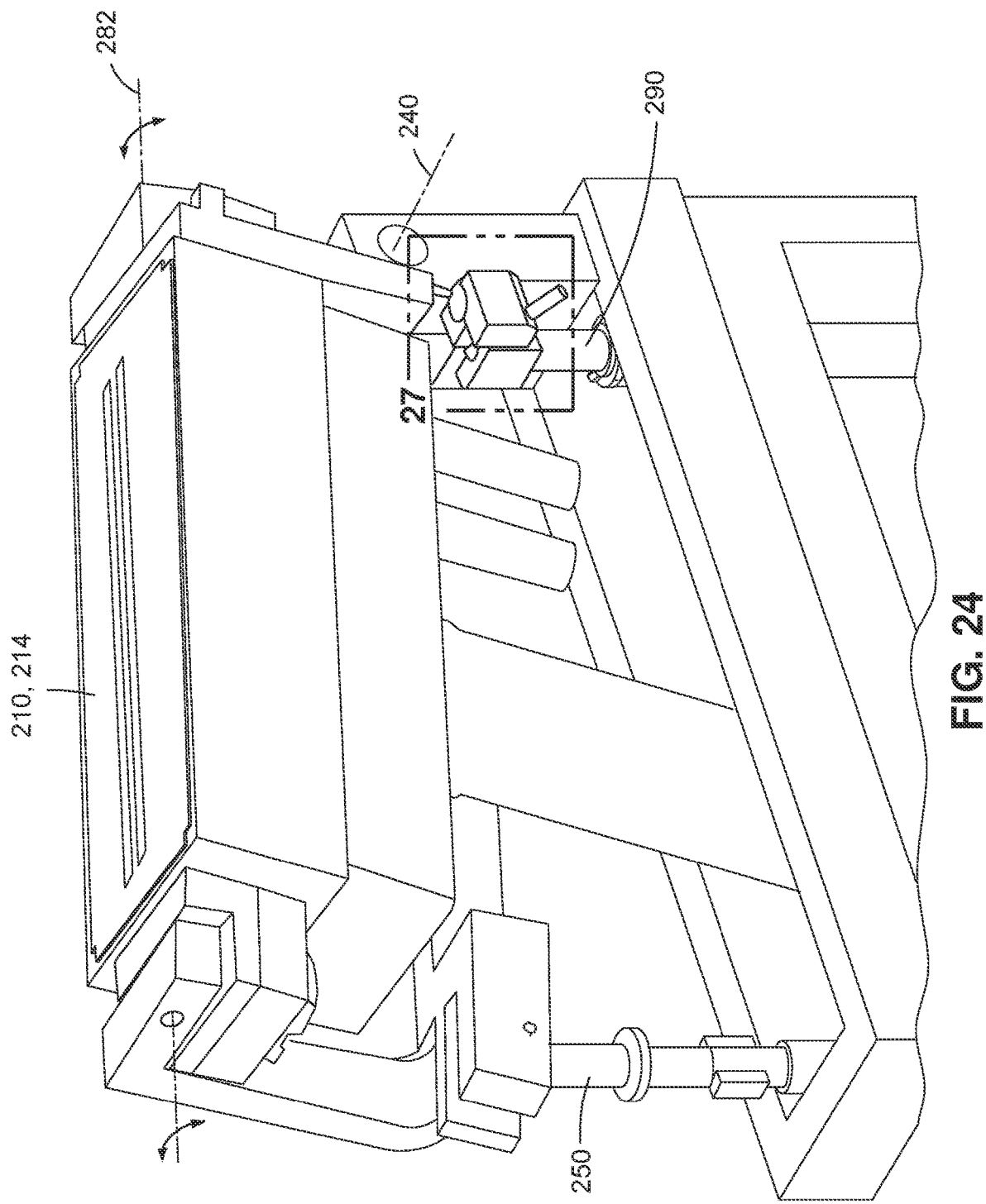
FIG. 24 is a perspective view of the yaw actuator pivoting the device head about the yaw axis.
Figure 25:
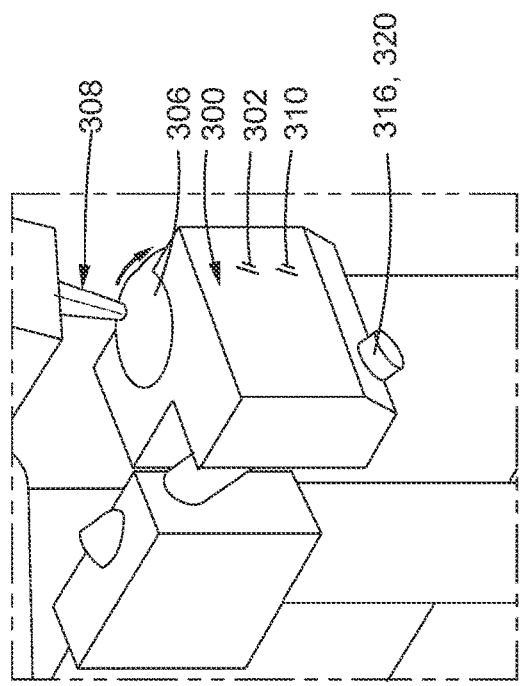
FIG. 25 is a magnified view of the universal joint assembly taken along line 25 of FIG. 21, and illustrating the position of a universal joint on a linear guide mechanism when the device head is in the home position.

Referring to FIGS. 21-27, shown are illustrations of the device head 210 prior to and during pivoting motion using the pitch-yaw actuation system 230. FIG. 21 shows the device head 210 in a home position 212, prior to pivoting about the pitch axis 240 and yaw axis 282. FIG. 25 is a magnified view of the universal joint assembly 300 showing the position of the joint body 310 on the guide pin 320 when the device head 210 is in the home position 212. In the illustration, the ball stud 308 has a generally vertical orientation.

Figure 22:
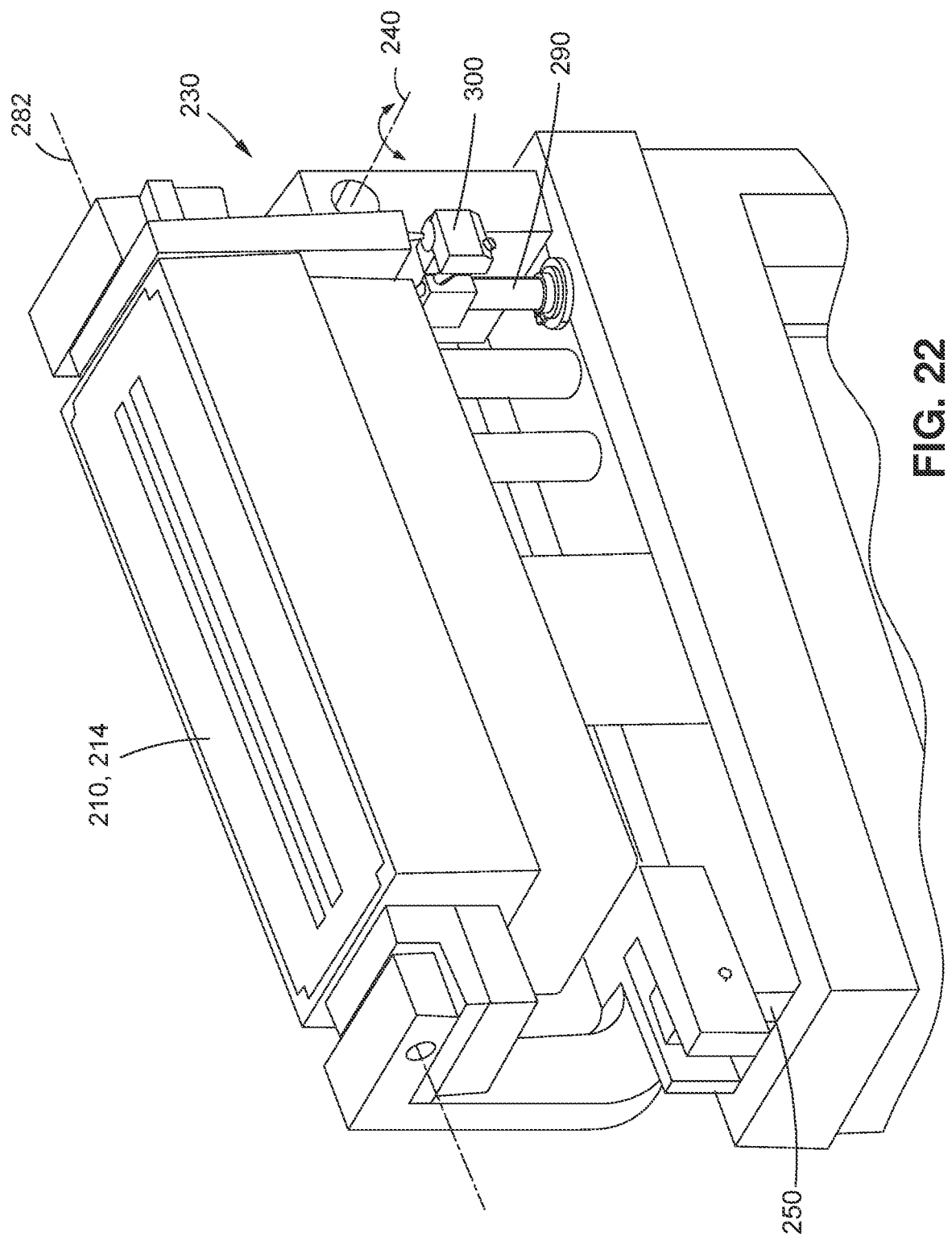
FIG. 22 is a perspective view of the pitch actuator pivoting the device head downwardly about the pitch axis.
Figure 26:
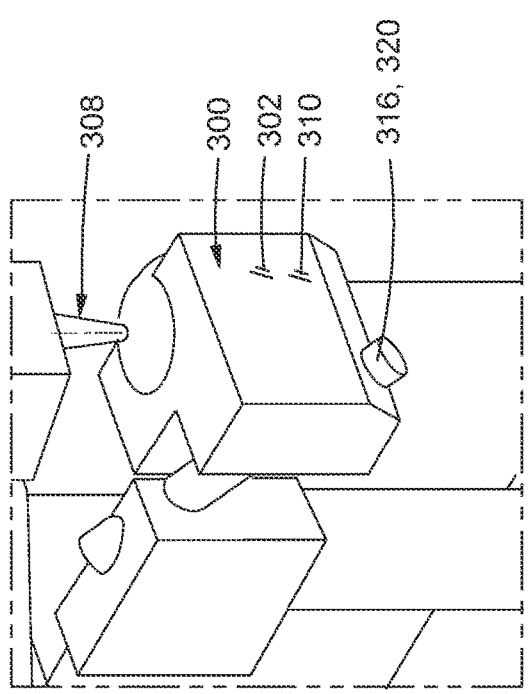
FIG. 26 is a magnified view of the universal joint assembly taken along line 26 of FIG. 23, and illustrating the rotation of the ball within the socket of the universal joint when the device head is pivoted about the pitch axis.

FIG. 22 shows the pitch actuator 250 pivoting the device head 210 downwardly about the pitch axis 240, and FIG. 23 shows the pitch actuator 250 pivoting the device head 210 upwardly about the pitch axis 240. FIG. 26 is a magnified view of the universal joint assembly 300 showing the rotation of the ball 306 within the joint body 310 of the universal joint 302 when the device head 210 is pivoted about the pitch axis 240. The rotation of the ball 306 is evident from the non-vertical orientation of the axis of the ball stud 308 in FIG. 26, relative to the vertical orientation of the ball stud 308 axis in FIG. 25.

Figure 27:
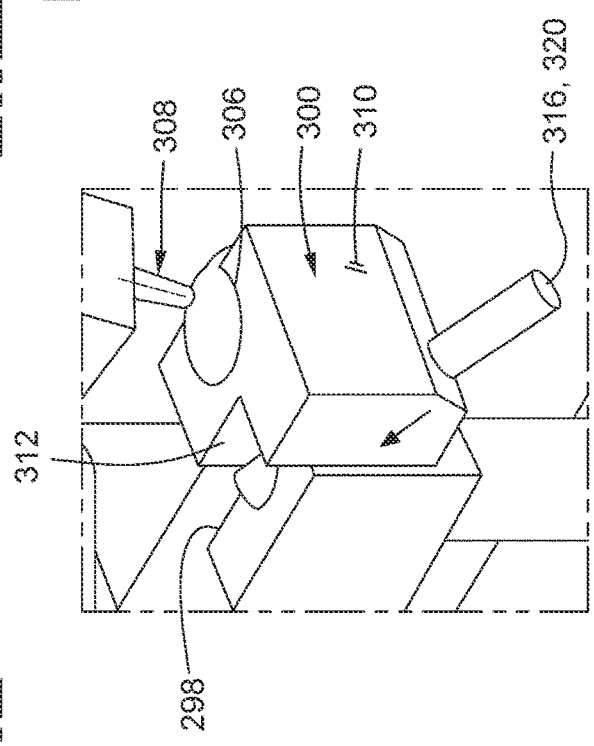
FIG. 27 is a magnified view of the universal joint assembly taken along line 27 of FIG. 24, and illustrating the movement of the universal joint along the guide pin when the device head is pivoted about the yaw axis.

FIG. 24 shows the yaw actuator 290 pivoting the device head 210 about the yaw axis 282 while the device head 210 remains pivoted about the pitch axis 240. FIG. 27 is a magnified view of the universal joint assembly 300 showing slightly more rotation of the ball 306 within the joint body 310 as a result of the pivoting of the device head 210 about the yaw axis 282. Additionally, FIG. 27 shows the universal joint 302 repositioned along the linear guide mechanism 316 as a result of the device head 210 pivoting about the yaw axis 282. As mentioned above, the joint body side face 312 slides in close parallel relation to the terminal end side face 298 as the joint body 310 slides along the guide pin 320, thereby preventing rotation of the joint body 310 about the guide pin 320. As illustrated in FIGS. 21-27, the combination of the universal joint 302 and linear guide mechanism 316 allows for simultaneous pivoting motion and yawing motion of the device head 210, and thereby facilitates movement of the device head 210 within a wide range of motion.

Advantageously, the pitch-yaw actuation system 230 is configured to fit within a relatively small footprint or cross-sectional area. For example, the pitch-yaw actuation system 230 is configured such that the pitch frame 232, the yaw frame 270, the pitch actuator 250, the yaw actuator 290, and/or the universal joint assembly 300 are non-protruding from the cross-sectional perimeter of the head frame 202 when viewed along a direction parallel to the actuator axes 258. As mentioned above, the small footprint of the pitch-yaw actuation system 230 allows for packing a large number of device head assemblies 200 within a single device frame 124 (e.g., see FIG. 8). The small footprint is due in part to the orientation of the pitch actuator 250 and yaw actuator 290 parallel to the depthwise direction of the head frame 202. In this regard, the use of linear actuators 260 (i.e., the pitch actuator 250 and the yaw actuator 290) to provide the pivot-driving force, instead of more bulky rotary actuators, capitalizes on the relatively long depth of the head frame 202, and keeps the pivot-driving forces away from contamination-sensitive article surfaces 422 directly underneath the inkjet printhead 214.

Figure 28:
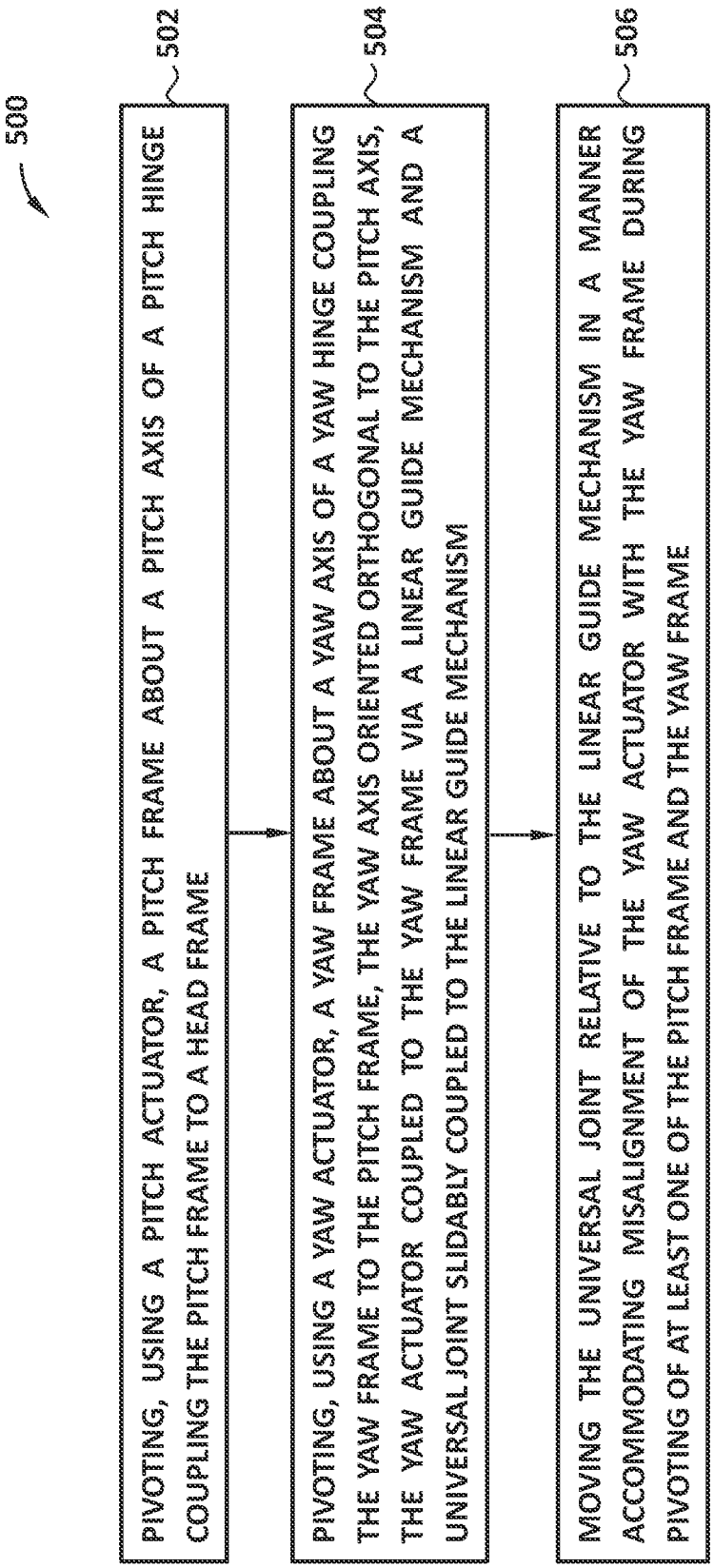
FIG. 28 is a flowchart of operations included in a method of actuating a device head.

Referring now to FIG. 28, shown is a flowchart of operations included in a method 500 of actuating a device head 210 of a treatment device 122. As described above and shown in FIGS. 8, a plurality of device heads 210 are supported in close proximity to each other within a device frame 124 of each treatment device 122. FIGS. 1-3 show arrays 120 of treatment devices 122 being moved along a fuselage 426 for treating the fuselage surfaces.

Step 502 of the method 500 comprises pivoting, using a pitch actuator 250, a pitch frame 232 about a pitch axis 240 of a pitch hinge 238 coupling the pitch frame 232 to a head frame 202. As shown in FIGS. 10-16 and described above, the pitch frame 232 is coupled to the head frame hinge post 208, which protrudes upwardly from the head frame 202. In the example shown, step 502 of pivoting the pitch frame 232 about the pitch axis 240 comprises pivoting the pitch frame 232 about the pitch axis 240 of the pitch hinge 238 integrated into one side of the pitch frame 232. As shown in FIG. 14 and described above, a pitch hinge pin 242 extends through the pitch hinge bores 244 respectively formed in the head frame hinge post 208 and the pitch frame 232, to thereby couple the pitch frame 232 to the head frame 202.

Step 504 of the method 500 comprises pivoting, using a yaw actuator 290, a yaw frame 270 about a yaw axis 282 of a yaw hinge 280 coupling the yaw frame 270 to the pitch frame 232. As shown in FIGS. 10-16 and described above, the yaw axis 282 is oriented orthogonal to the pitch axis 240. In addition, the yaw actuator 290 is coupled to the yaw frame 270 via a universal joint assembly 300. As described above, the universal joint assembly 300 includes a linear guide mechanism 316 and a universal joint 302 slidably coupled to the linear guide mechanism 316. In the example shown, step 504 of pivoting the yaw frame 270 about the yaw axis 282 comprises pivoting the yaw frame 270 about the yaw axis 282 of the yaw hinges 280 integrated into the pitch frame 232 and the yaw frame 270. In addition, step 504 includes pivoting the yaw frame 270 about the yaw axis 282 defined by a pair of yaw hinges 280 respectively on opposite sides of the pitch frame 232. For example, as shown in FIGS. 10-16 and described above, on each side of the device head 210, a yaw hinge pin 284 extends into a yaw hinge bore 286 formed in either the yaw frame first portion 272 or yaw frame second portion 274.

In the example shown, step 502 of pivoting the pitch frame 232 is performed via the pitch actuator 250 configured as a linear actuator 260. In this regard, step 502 of pivoting the pitch frame 232 is performed by a linear actuator 260 configured as an electric linear actuator 260 having a ballscrew mechanism (not shown) and a pushrod 264 threadably engaged to the ballscrew mechanism for axially moving the pushrod 264. Likewise, step 504 of pivoting the yaw frame 270 is performed via the yaw actuator 290 configured as a linear actuator 260, which may also be configured as an electric linear actuator 260 similar to the above-described pitch actuator 250.

As shown in FIGS. 10-16, step 502 of pivoting the pitch frame 232 and step 504 of pivoting the yaw frame 270 are respectively performed by the pitch actuator 250 and the yaw actuator 290 located on opposite sides of the device head 210. In the example shown, step 502 of pivoting the pitch frame 232 is performed by the pitch actuator 250 actuating along an actuator axis 258 oriented orthogonal to both the pitch axis 240 and the yaw axis 282. Likewise, step 504 of pivoting the yaw frame 270 is performed by the yaw actuator 20 actuating along an actuator axis 258 oriented orthogonal to both the pitch axis 240 and the yaw axis 282. As mentioned above, the actuator axis 258 of the pitch actuator 250 and the actuator axis 258 of the yaw actuator 290 are generally parallel to each other. Step 502 of pivoting the pitch frame 232 about the pitch axis 240 includes pivoting the pitch frame 232 about the pitch axis 240 located between the yaw axis 282 and the universal joint assembly 300, as shown in FIG. 20. However, in another example not shown, the universal joint assembly 300 may be located between the pitch axis 240 and the yaw axis 282

Figure 17:
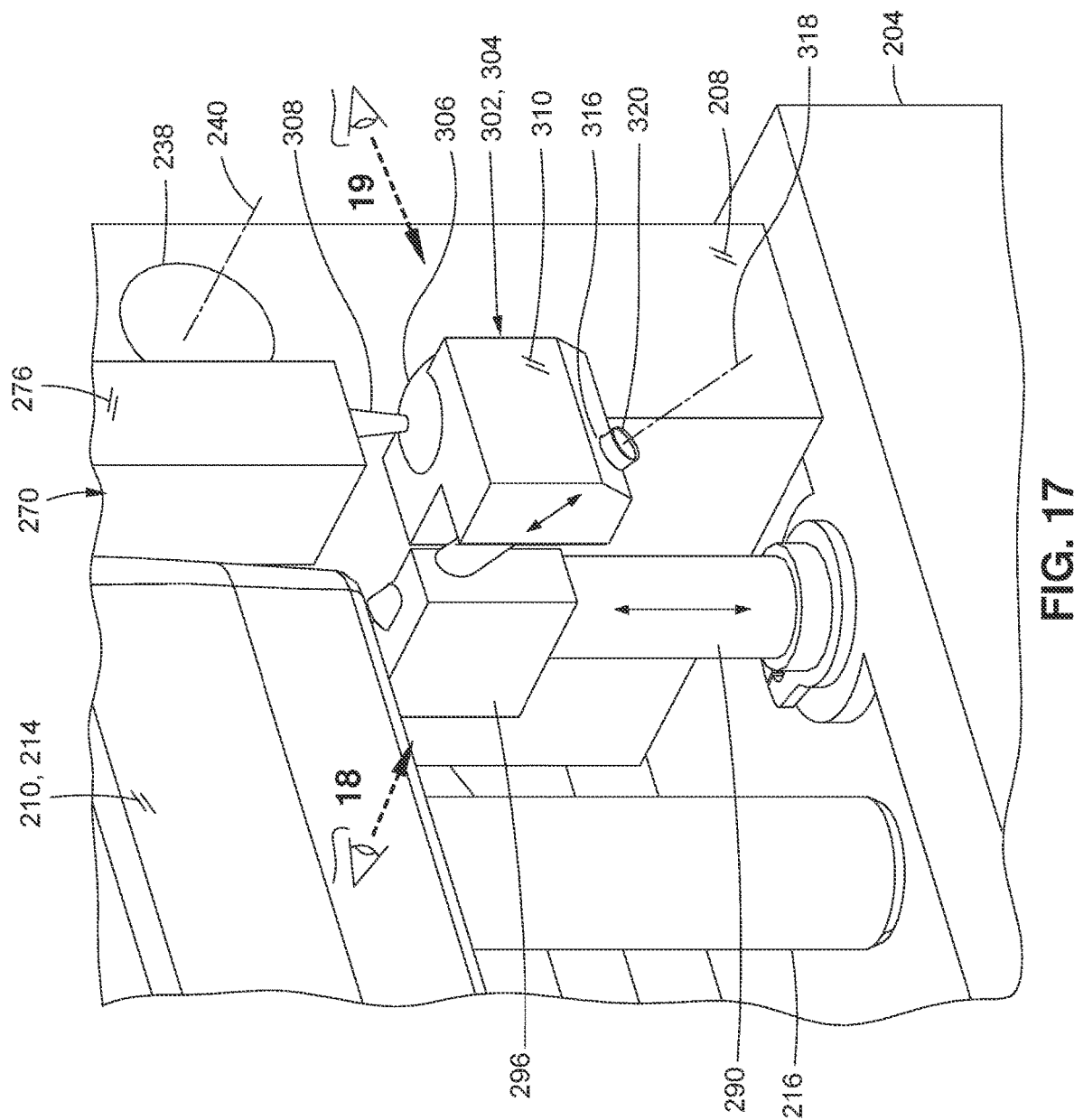
FIG. 17 is a magnified view of the portion of the pitch-yaw actuation system identified by reference numeral 17 of FIG. 13, and illustrating an example of the universal joint assembly coupling the yaw actuator to the yaw frame.

Step 506 of the method 500 comprises moving the universal joint 302 relative to the linear guide mechanism 316 in a manner accommodating misalignment of the yaw actuator 290 with the yaw frame 270 during pivoting of at least one of the pitch frame 232 and the yaw frame 270. As indicated above, the universal joint assembly 300 couples the yaw actuator 290 to the yaw frame arm 276. For examples in which the universal joint 302 is made up of a joint body 310 having a socket 314 containing a ball 306 as shown in FIGS. 17-19, step 506 comprises translating the joint body 310 along the linear guide mechanism 316. Referring to FIG. 20, translating the universal joint 302 along the linear guide mechanism 316 includes translating the universal joint 302 along the guide mechanism axis 318 oriented at an acute angle relative to the pitch axis 240 when the head frame 202 is viewed along a direction parallel to the yaw axis 282. In the example shown, the universal joint 302 is translated along the guide mechanism axis 318 oriented at an angle of approximately 45 degrees.

Referring to FIGS. 26-27, step 506 of moving the universal joint 302 relative to the linear guide mechanism 316 comprises sliding a guide pin 320 within a guide pin bore 322. In the example shown, the guide pin 320 is fixedly coupled to the yaw actuator terminal end 296, and the guide pin 320 slides within a guide pin bore 322 in the joint body 310. However in other examples not shown, the guide pin 320 may be fixedly coupled to the joint body 310, and the guide pin 320 slides within a guide pin bore 322 formed in the yaw actuator terminal end 296. As shown in FIG. 26, step 506 of moving the universal joint 302 relative to the linear guide mechanism 316 includes rotating the ball 306 within the socket 314 formed in the joint body 310 of the ball-and-socket joint 304. The ball 306 rotates within the socket 314 during pivoting of the device head 210 about the pitch axis 240 and/or during pivoting of the device head 210 at about the yaw axis 282.

The method 500 further includes discharging a treatment from a device head 210 supported by the pitch frame 232 and the yaw frame 270. The treatment is discharged from the device head 210 prior to, during, and/or after pivoting of the device head 210 about the pitch axis 240 and/or yaw axis 282. As mentioned above, the device head 210 is configured to dispense the treatment along a dispensing direction 128 toward an article surface 422 of an article 420, such as for applying a livery to an aircraft fuselage.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A pitch-yaw actuation system for actuating a device head, comprising: a pitch frame pivotably coupled to a head frame via a pitch hinge having a pitch axis;
a yaw frame pivotably coupled to the pitch frame via a yaw hinge having a yaw axis orthogonal to the pitch axis;
a pitch actuator configured to pivot the pitch frame about the pitch axis;
a yaw actuator configured to pivot the yaw frame about the yaw axis;
a universal joint assembly coupling the yaw actuator to the yaw frame, and including:
a linear guide mechanism having a guide mechanism axis;
a universal joint slidably coupled to the linear guide mechanism; and
the guide mechanism axis is oriented at an angle that allows the universal joint to move in a manner accommodating misalignment of the yaw actuator with the yaw frame during pivoting of at least one of the pitch frame and the yaw frame.

2. The pitch-yaw actuation system of claim 1, wherein: at least one of the pitch actuator and the yaw actuator is a linear actuator.

3. The pitch-yaw actuation system of claim 1, wherein: the pitch axis is located between the yaw axis and the universal joint.

4. The pitch-yaw actuation system of claim 1, wherein: the linear guide mechanism is configured to allow the universal joint to translate along the linear guide mechanism while simultaneously rotating about the guide mechanism axis.

5. The pitch-yaw actuation system of claim 1, wherein: the universal joint is a ball-and-socket joint having a ball, and a joint body having a socket configured to receive the ball.

6. The pitch-yaw actuation system of claim 1, wherein: the linear guide mechanism comprises a guide pin, and a guide pin bore slidably receiving the guide pin.

7. The pitch-yaw actuation system of claim 1, wherein: the yaw frame receiving a device head configured to discharge a treatment.

8. The pitch-yaw actuation system of claim 1, wherein: the yaw frame has a yaw frame opening receiving the device head, the pitch-yaw actuation system includes a pair of yaw hinges respectively on opposite sides of the pitch frame.

9. A device head assembly, comprising: a head frame; a pitch-yaw actuation system, including: a pitch frame coupled to the head frame via a pitch hinge having a pitch axis; a yaw frame coupled to the pitch frame via a yaw hinge having a yaw axis orthogonal to the pitch axis, the yaw frame configured to receive a device head; a pitch actuator coupled to the head frame and configured to pivot the pitch frame about the pitch axis;
a yaw actuator coupled to the head frame and configured to pivot the yaw frame about the yaw axis; a universal joint assembly coupling the yaw actuator to the yaw frame, and including: a linear guide mechanism having a guide mechanism axis; a universal joint slidably coupled to the linear guide mechanism; and the guide mechanism axis is oriented at an angle allowing the universal joint to move relative to the linear guide mechanism in a manner accommodating misalignment of the yaw actuator with the yaw frame during pivoting of the pitch frame and the yaw frame.

10. The device head assembly of claim 9, wherein: the head frame has a head frame cross-sectional perimeter; and at least one of the pitch frame, the yaw frame, the pitch actuator, the yaw actuator, and the universal joint assembly are non-protruding from the head frame cross-sectional perimeter when the head frame is viewed along a direction parallel to an actuator axis of the pitch actuator and the yaw actuator.

11. The device head assembly of claim 9, wherein: at least one of the pitch actuator and the yaw actuator is a linear actuator.

12. The device head assembly of claim 9, wherein: the linear guide mechanism allowing the universal joint to translate along the linear guide mechanism while simultaneously rotating about the guide mechanism axis.

13. The device head assembly of claim 9, wherein: the universal joint is a ball-and-socket joint having a ball, and a joint body having a socket configured to receive the ball.

14. The device head assembly of claim 9, wherein: the linear guide mechanism comprises a guide pin, and a guide pin bore slidably receiving the guide pin.

15. A method of actuating a device head, comprising: pivoting, using a pitch actuator, a pitch frame about a pitch axis of a pitch hinge coupling the pitch frame to a head frame;
pivoting, using a yaw actuator, a yaw frame about a yaw axis of a yaw hinge coupling the yaw frame to the pitch frame, the yaw axis oriented orthogonal to the pitch axis, the yaw actuator coupled to the yaw frame via a linear guide mechanism and a universal joint slidably coupled to the linear guide mechanism;
moving the universal joint along the linear guide mechanism; which has the guide mechanism axis is oriented at an angle that allows the universal joint to move in a manner accommodating misalignment of the yaw actuator with the yaw frame during pivoting of at least one of the pitch frame and the yaw frame.

16. The method of claim 15, wherein at least one of pivoting the pitch frame and pivoting the yaw frame are respectively performed by the pitch actuator and the yaw actuator, each configured as a linear actuator.

17. The method of claim 15, wherein pivoting the pitch frame about the pitch axis comprises: pivoting the pitch frame about the pitch axis located between the yaw axis and the universal joint.

18. The method of claim 15, wherein moving the universal joint relative to the linear guide mechanism comprises: rotating a ball within a socket formed in a joint body of a ball-and-socket joint.

19. The method of claim 15, wherein moving the universal joint relative to the linear guide mechanism comprises: sliding a guide pin within a guide pin bore.

20. The method of claim 15, further comprising: discharging a treatment from the device head supported by the pitch frame and the yaw frame.

* * * * *